United States Patent
Fukuoka et al.

(10) Patent No.: US 7,852,903 B2
(45) Date of Patent: Dec. 14, 2010

(54) WIRELESS TRANSMISSION DEVICE, WIRELESS RECEPTION DEVICE, AND SYMBOL ARRANGING METHOD

(75) Inventors: Masaru Fukuoka, Ishikawa (JP); Isamu Yoshii, Kanagawa (JP); Kenichi Miyoshi, Kanagawa (JP)

(73) Assignee: Panasonic Corporation, Osaka (JP)

( * ) Notice: Subject to any disclaimer, the term of this patent is extended or adjusted under 35 U.S.C. 154(b) by 982 days.

(21) Appl. No.: 11/630,142

(22) PCT Filed: May 20, 2005

(86) PCT No.: PCT/JP2005/009253

§ 371 (c)(1),
(2), (4) Date: Dec. 20, 2006

(87) PCT Pub. No.: WO2006/001143

PCT Pub. Date: Jan. 5, 2006

(65) Prior Publication Data

US 2008/0031307 A1     Feb. 7, 2008

(30) Foreign Application Priority Data

Jun. 24, 2004   (JP) .............................. 2004-186964

(51) Int. Cl.
  *H04B 7/02*   (2006.01)
(52) U.S. Cl. ........................ 375/130; 375/141; 375/146; 375/260; 375/267; 375/295; 375/299
(58) Field of Classification Search ................. 375/130, 375/141, 146, 260, 267, 295, 299
See application file for complete search history.

(56) References Cited

U.S. PATENT DOCUMENTS 5,414,728 A  *  5/1995  Zehavi ...................... 375/142

(Continued)

FOREIGN PATENT DOCUMENTS

JP           9153883           6/1997

(Continued)

OTHER PUBLICATIONS

Mottier, David, Method of mapping chips of a spread out symbol to sub-channels of a multi-carrier transmission network, Pulication date Apr. 20, 2005, EP 1524793 A1.*

(Continued)

*Primary Examiner*—Chieh M Fan
*Assistant Examiner*—Siu M Lee
(74) *Attorney, Agent, or Firm*—Dickinson Wright PLLC

(57)  ABSTRACT

A wireless transmission device enabled to improve an error rate performance at a receiver, by acquiring at least one of frequency diversity effect and a time diversity effect while keeping the interference resistance which is acquired by diffusion. In this transmission device, a modulation unit (101) modulates data to create a modulation symbol having in-phase components and quadrature components. An IQ individual spreading unit (102) arranges the diffusion chips, which are obtained by spreading the modulation symbol, of the in-phase components and the quadrature components, in areas extending in diffusion domains set individually for the in-phase components and the quadrature components. An IQ combining unit (103) combines the arranged spreading chips of the in-phase components and the quadrature components.

15 Claims, 19 Drawing Sheets

U.S. PATENT DOCUMENTS

| | | | |
|---|---|---|---|
| 5,956,328 A | | 9/1999 | Sato |
| 6,064,663 A | * | 5/2000 | Honkasalo et al. .......... 370/335 |
| 6,188,717 B1 | * | 2/2001 | Kaiser et al. ................ 375/148 |
| 6,249,517 B1 | * | 6/2001 | Roh et al. ................... 370/342 |
| 2002/0159425 A1 | * | 10/2002 | Uesugi et al. ............... 370/342 |
| 2004/0071105 A1 | | 4/2004 | Maeda |
| 2004/0085946 A1 | * | 5/2004 | Morita et al. ............... 370/342 |
| 2004/0156386 A1 | * | 8/2004 | Atarashi et al. ............. 370/441 |
| 2005/0207384 A1 | * | 9/2005 | Quick et al. ................. 370/342 |
| 2006/0045000 A1 | * | 3/2006 | Morlier et al. .............. 370/203 |
| 2008/0247374 A1 | * | 10/2008 | Haim ......................... 370/342 |

FOREIGN PATENT DOCUMENTS

| | | |
|---|---|---|
| JP | 9214466 | 8/1997 |
| JP | 20047729 | 1/2004 |
| JP | 2004-134978 | 4/2004 |

OTHER PUBLICATIONS

Japanese Office Action dated Jun. 9, 2009.

N. Maeda, et al., "VSF-OFCDM Using Two-Dimensional Spreading and Its Performance," IEICE Technical Report, vol. 102, No. 86, May 2002, pp. 59-64, with partial English translation.

S. Suwa, et al., "Cochannel Interface Canceller Using Different Interleaving for Interphase and Quadrature Components," OPNET, Mar. 1999, pp. 452, with partial English translation.

PCT International Search Report dated Jul. 19, 2005.

K. Miyoshi, et al.; "A Study on time domain spreading for OFCDM," Technical Report of IEICE, The institute of electronics, information and communication engineers, RCS 2001-179, Nov. 2001, pp. 13-18.

* cited by examiner

| THE NUMBER OF CODES MULTIPLEXED /SPREADING FACTOR | SPREADING DOMAIN |
|---|---|
| THRESHOLD VALUE EQUAL TO OR GREATER THAN $\alpha$ | SPREAD Ich IN TIME DOMAIN, SPREAD Qch IN TIME DOMAIN |
| THRESHOLD VALUE EQUAL TO OR GREATER THAN $\beta$ AND LESS THAN $\alpha$ | SPREAD Ich IN TIME DOMAIN, SPREAD Qch IN FREQUENCY DOMAIN OR SPREAD Ich IN FREQUENCY DOMAIN, SPREAD Qch IN TIME DOMAIN |
| THRESHOLD VALUE LESS THAN $\beta$ | SPREAD Ich IN FREQUENCY DOMAIN, SPREAD Qch IN FREQUENCY DOMAIN |

FIG.6

WIRELESS TRANSMISSION DEVICE, WIRELESS RECEPTION DEVICE, AND SYMBOL ARRANGING METHOD

TECHNICAL FIELD

The present invention relates to wireless transmission apparatus, wireless receiving apparatus and a symbol arrangement method used in the transmission and reception of spread modulation symbols.

BACKGROUND ART

In recent years, in mobile communication using radio waves, various information other than voice data such as image data and moving image data etc. has become the target of communication. In accordance with this, high-speed and large capacity wireless data communication is also sought after. It is known that when high-speed transmission is carried out in mobile communication, the influence of wave delays due to multipath cannot be ignored, and the reception performance deterioration may caused due to frequency selective fading.

OFDM (Orthogonal Frequency Division Multiplexing) schemes have been a focus of attention as an example of frequency selective fading, and of these, various investigations have taken place into the MC (Multi Carrier)-CDMA schemes (also referred to as the "OFCDM scheme") that is the combination with the CDMA (Code Division Multiple Access) scheme. MC-CDMA schemes are mainly classified into spreading in a time domain and spreading in a frequency domain (in the following, collectively referred to as "one-dimensional spreading") (for example, refer to non-patent document 1). FIG. 1A shows typical mapping of spreaded symbol in a frequency domain, and FIG. 1B shows typical mapping of spreaded symbol in a time domain.

In a wireless transmission method using frequency domain spreading, a plurality of chips generated by spreading of the modulation symbols are arranged at different subcarriers at the same time. On the other hand, in a wireless transmission method using the time domain spreading, a plurality of chips generated by spreading of modulation symbols are arranged at different OFDM symbols at the same frequency.

Non-Patent Document: A study on time domain spreading for OFCDM, Technical Report of IEICE, RCS2001-179.

DISCLOSURE OF INVENTION

Problems to be Solved by the Invention

With wireless transmission methods using frequency domain spreading, although frequency diversity effect can be obtained, time diversity effect cannot not be obtained. With wireless transmission methods using time domain spreading, although time diversity effect can be obtained, frequency diversity effect cannot not be obtained.

For this reason, there are cases of using so-called two-dimensional spreading where both frequency domain spreading and time domain spreading are carried out on modulation symbols. When wireless transmission methods are carried out using two-dimensional spreading, a plurality of chips generated by spreading are arranged over a broad range of the two-dimensional region, and, at least, one of the frequency domain diversity effect and the time domain diversity effect can be obtained.

Assume that such a two-dimensional spreading is used for wireless transmission where a signal for a plurality of users are code division multiplexed and an orthogonal code is used for spreading processing. In this case, in time domain spreading, when mobility of a receiver is high, reception sensitivity rapidly fluctuations in the time domain. Further, in frequency domain spreading, when delay spread is large, correlation with neighboring subcarriers is low due to the influence of the frequency selective fading. Namely, when the spreading chips are arranged over a broad range in a two-dimensional region, it is no longer straightforward to maintain orthogonality, and spreading factor consequently has to be restricted. It is therefore no longer straightforward to increase interference resistance obtained by spreading, to a practical level.

In the view of foregoing, it is therefore an object of the present invention to provide wireless transmission apparatus, wireless receiving apparatus and a symbol arrangement method whereby interference resistance is maintained, and a reception error rate at a receiver is improved by obtaining the frequency diversity effect and/or the time diversity effect.

Means for Solving the Problem

A wireless transmission apparatus of the present invention therefore adopts a configuration having a modulation section that modulates data and generates a modulation symbol comprised of an in-phase component channel and an quadrature component channel, an arrangement section that arranges a spreading chip of the in-phase component channel and a spreading chip of the quadrature component channel obtained by spreading the modulation symbol in spreading domains set for the in-phase component and the quadrature component individually, and a combining section that combines the arranged in-phase component spreading chip and the quadrature component spreading chip.

A wireless receiving apparatus of the present invention adopts a configuration having a separating section that separates a spreading chip of an in-phase component and a spreading chip of the quadrature component from a signal containing the spreading chip of the in-phase component and the spreading chip of the quadrature component, the signal having the spreading chip of the in-phase component and the spreading chip of the quadrature component arranged in spreading domains set for the in-phase component and the quadrature component individually; an acquisition section that acquires a modulation symbol from the spreading chip of the in-phase component and the spreading chip of the quadrature component; and a demodulation section that demodulates data from the obtained modulation symbol.

A symbol arrangement method of the present invention is therefore a symbol arrangement method of arranging a modulation symbol comprised of an in-phase component and an quadrature component, and arranges a spreading chip of the in-phase component and a spreading chip of the quadrature component obtained by spreading the modulation symbol in spreading domains set for the in-phase component and the quadrature component individually.

Advantageous Effect of the Invention

According to the present invention, it is possible to maintain interference resistance, and improve the error rate performance at a receiver by obtaining the frequency diversity effect and/or the time diversity effect.

BRIEF DESCRIPTION OF THE DRAWINGS

FIG. 6 is a view showing a table for deciding spreading domain of Embodiment 1 of the present invention;

BEST MODE FOR CARRYING OUT THE INVENTION

Now, embodiments of the present invention will be described below in detail using the accompanying drawings.

Embodiment 1

Figure 1A:
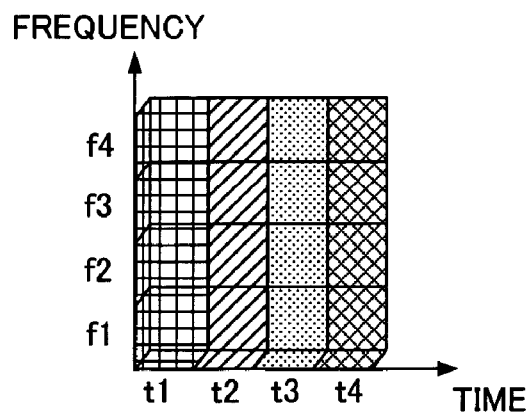
FIG. 1A is a view showing frequency domain spreading of the related art.
Figure 1B:
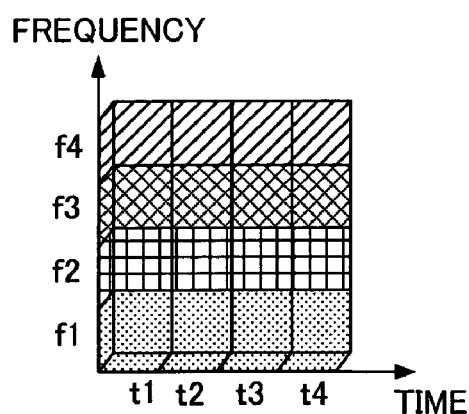
FIG. 1B is a view showing time domain spreading of the related art.
Figure 2A:
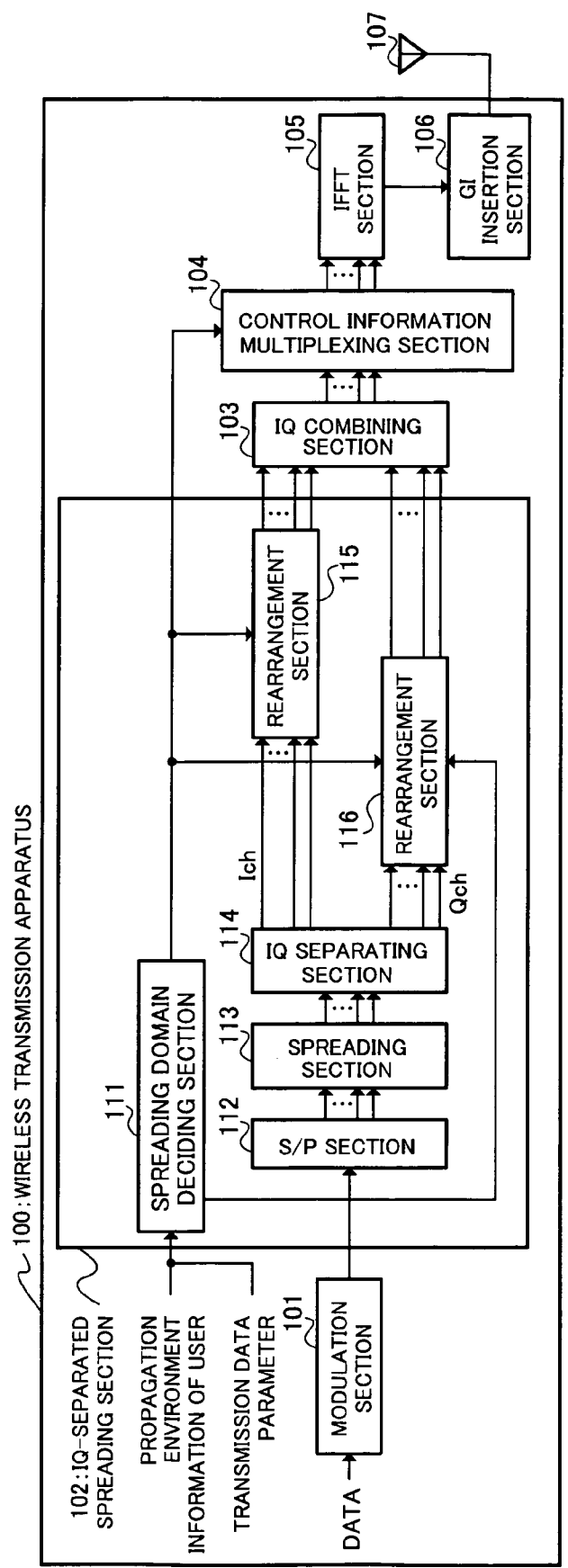
FIG. 2A is a block view showing a configuration for wireless transmission apparatus of Embodiment 1 of the present invention.
Figure 2B:
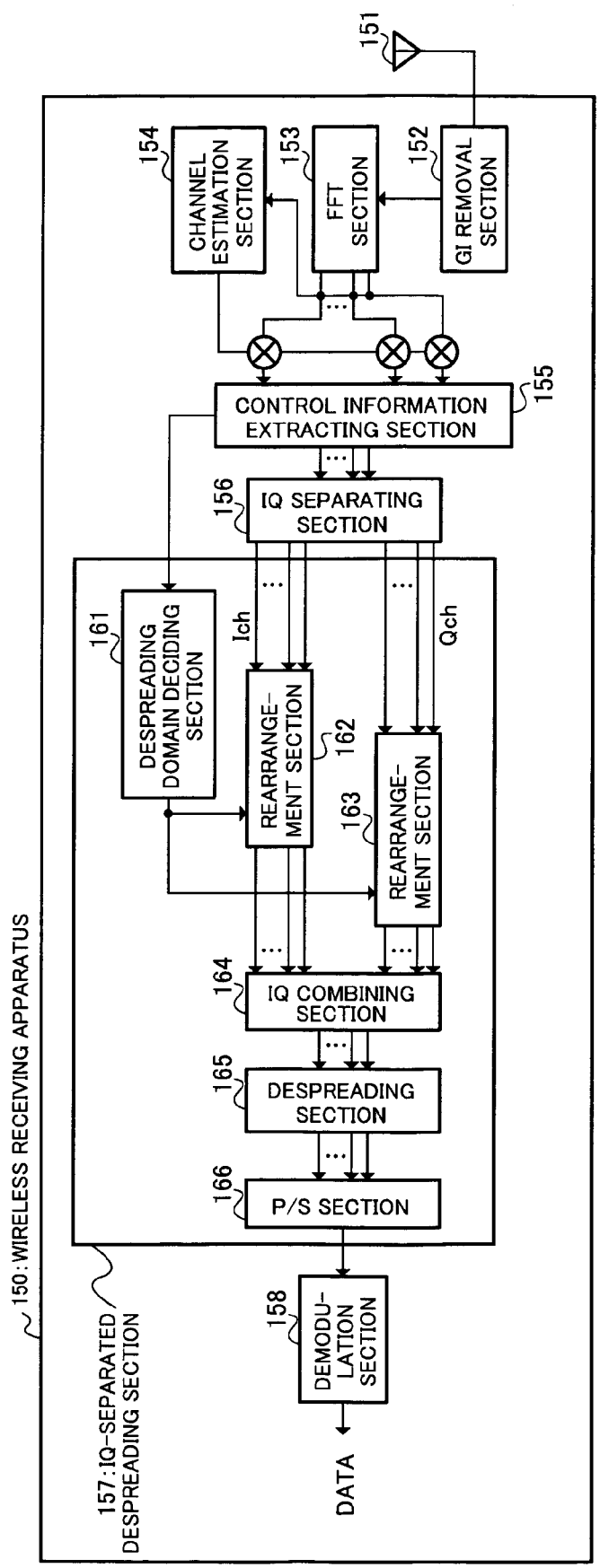
FIG. 2B is a block view showing a configuration for wireless receiving apparatus of Embodiment 1 of the present invention.

FIG. 1A and FIG. 2B are block views respectively showing a wireless transmission apparatus and wireless receiving apparatus of the MC-CDMA scheme of Embodiment 1 of the present invention. A wireless transmission apparatus is used as a base station apparatus in a mobile communication system. Further, a wireless receiving apparatus is used as a mobile terminal apparatus in a mobile communication system. Namely, the wireless transmission apparatus and wireless receiving apparatus are utilized in downlink data transmission. The wireless transmission apparatus and the wireless receiving apparatus can be used for uplink data transmission as a mobile terminal apparatus and base station apparatus, respectively.

Wireless transmission apparatus 100 shown in FIG. 2A has: modulation section 101 that modulates data for a user (wireless receiving apparatus 150) and generates modulation symbols comprised of an in-phase component (Ich component) and quadrature component (Qch component); IQ-separated spreading section 102 that acquires a spreading chip of an Ich component (hereinafter referred to as an "Ich spreading chip") and a spreading chip of a Qch component (hereinafter referred to as a "Qch spreading chip") from the generated modulation symbols, and individually arranges the Ich spreading chip and Qch spreading chip in a two-dimensional region having a time domain and a frequency domain; IQ combining section 103 that combines the arranged Ich spreading chip and Qch spreading chip; control information multiplexing section 104 that multiplexes control information (described later) with the combining results (hereinafter, the modulation symbols after combining are referred to as "transmission data"), IFFT section 105 that carries out IFFT (Inverse Fast Fourier Transformation) on the transmission data after multiplexing; GI insertion section 106 that inserts GI's (Guard Intervals) into predetermined positions in transmission data after IFFT; and antenna 107 that transmits transmission data subjected to predetermined wireless transmission processing by wireless transmission section (not shown) after GI insertion.

Modulation section 101 modulates data using a modulation scheme selected according to a propagation path condition with wireless receiving apparatus 150. As modulation schemes for use, for example, QPSK (Quadrature Phase Shift Keying) scheme and 16QAM (Quadrature Amplitude Modulation) scheme are included. Modulation section 101 then carries out data modulation by mapping data on a constellation corresponding to the selected modulation scheme.

Figure 3A:
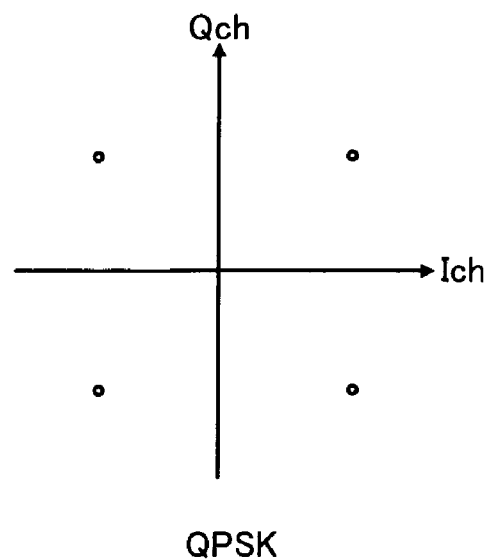
FIG. 3A is a view showing a QPSK constellation that is not subjected to phase rotation.
Figure 3B:
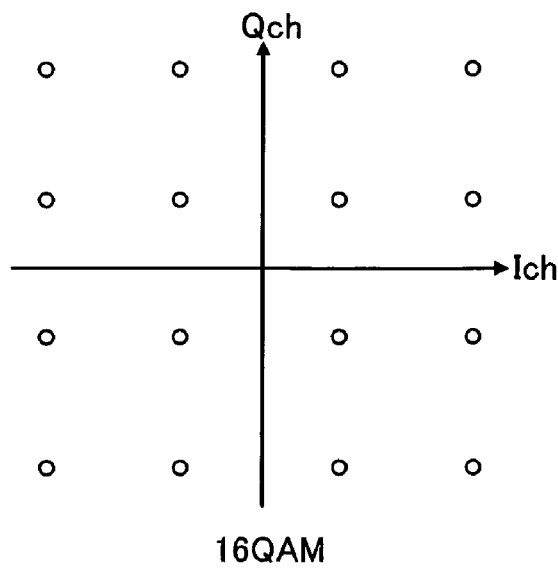
FIG. 3B is a view showing a 16QAM constellation that is not subjected to phase rotation.
Figure 4A:
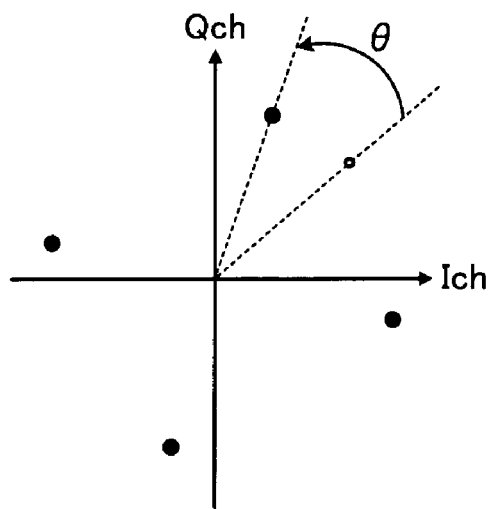
FIG. 4A is a view showing a QPSK constellation that is subjected to phase rotation.
Figure 4B:
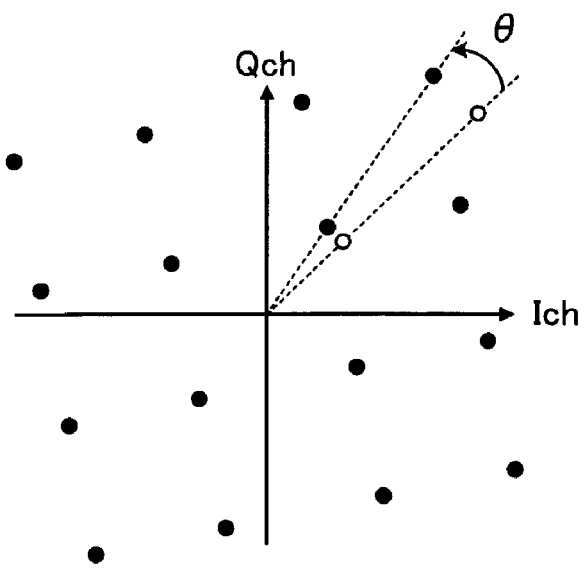
FIG. 4B is a view showing a 16QAM constellation that is subjected to phase rotation.

In this embodiment, a constellation, which is subjected to phase rotation by a predetermined amount with respect to a typical constellation of the modulation schemes, is used. For example, typical constellations for the QPSK scheme and the 16QAM scheme are as shown in FIG. 3A and FIG. 3B, respectively. With regards to this, constellations for the QPSK scheme and the 16QAM scheme used in this embodiment are as shown in FIG. 4A and FIG. 4B, respectively. Phase rotation amount θ at the constellation for use is decided in advance. Preferably, an angle at which information of constellation point can be individually contained in the one dimensional signal (Ich component and Qch component) after IQ separation is decided. For example, 26.6 degrees for the QPSK scheme, and 14.0 degrees for the 16QAM scheme. By using such a constellation subjected to phase rotation, it is possible to accurately perform data demodulation using just the components that can be correctly received even if one of the Ich component and Qch component cannot be correctly received at wireless receiving apparatus 150, thereby remarkably improving the reception characteristics.

In this embodiment, an example is described where a constellation subjected to phase rotation is used. However, if, for example, constellations that are not subjected to phase rotation as shown in FIG. 3A and FIG. 3B are used, it is possible to maintain interference resistance obtained by spreading, and improves the error rate performance at the receiver by obtaining at least one of the frequency diversity effect and the time diversity effect.

IQ-separated spreading section 102 is a arrangement section that arranges Ich spreading chip and Qch spreading chip obtained by spreading the modulation symbols in spreading domain individually set for the Ich component and the Qch component, and has spreading domain deciding section 111, serial/parallel conversion (S/P) section 112, spreading section 113, IQ separating section 114, and rearrangement sections 115 and 116.

Spreading domain deciding section 111 decides the spreading domain of the Ich spreading chip and the Qch spreading chip, that is, the domain of arrangement of the spreading chips in the two-dimensional region individually and variably, according to transmission data parameters and propagation path condition. Further, spreading direction deciding section 111 decides the arrangement position of the Ich spreading chip and the Qch spreading chip in the two-dimensional region. Information relating to the decided spreading domain and arrangement position is outputted to rearrangement sections 115 and 116 and control information multiplexing section 104 as control information.

As transmission data parameters, for example, a modulation and coding scheme, spreading rate, and the number of codes multiplexed for the transmission data are included. This depends on, for example, a request for data from a user a receiving signal and transmission data amount from a base station apparatus. For example, for a user who wants to receive a mail, a small volume of information is sufficient, and, therefore, the QPSK which has a smaller M-ary number than the 16QAM is used. On the other hand, for a user who wants to make video calls, a large amount of information is required, and, therefore, 16QAM which has a greater M-ary number than the QPSK is used. Setting of the spreading domain is carried out based on these transmission data parameters. For example, the priority between time domain spreading and frequency domain spreading changes in accordance with change of the M-ary number. Specifically, when a modulation scheme having M-ary number equal to or greater than a predetermined value is used, setting is carried out in such a manner that the priority of time domain spreading is raised (in other words, the priority of frequency domain spreading is lowered), and time domain spreading is actively used.

Further, as information indicating propagation path condition, propagation environment information (including, for example, delay spread and Doppler frequency) per user receiving signals is included as an example. This is information depending on the situation the user is in, including, for example, the distance from the base station apparatus, line of sight environment or shadowing environment, cell edge, or fast-moving environment, and fed back from the user. Setting of the spreading direction is carried out based on this information indicating the propagation path condition. For example, the priority between time domain spreading and frequency domain spreading changes in accordance with changes in delay spread or Doppler frequency. Specifically, when delay spread is equal to or greater than a predetermined value, destroying orthogonality is more likely to occur in the frequency domain spreading than in the time domain spreading. Setting is therefore carried out in such a manner that the priority of the time domain spreading is raised (in other words, the priority of the frequency domain spreading is lowered) and the time domain spreading is actively used. Further, when the Doppler frequency is equal to or greater than a predetermined value, destroying orthogonality is more likely to occur in the time domain spreading than in the frequency domain spreading. Setting is therefore carried out in such a manner that the priority of frequency direction spreading is raised (in other words, the priority of the time domain spreading is lowered), and the frequency domain spreading is actively used.

In a case of beginning communication where there is no feedback information obtained from the user or when feedback information cannot be received, propagation environment information cannot be obtained. However, even in this case also, the downlink transmission data parameters are decided, and, it is therefore possible to carry out spreading domain setting.

Figure 5:
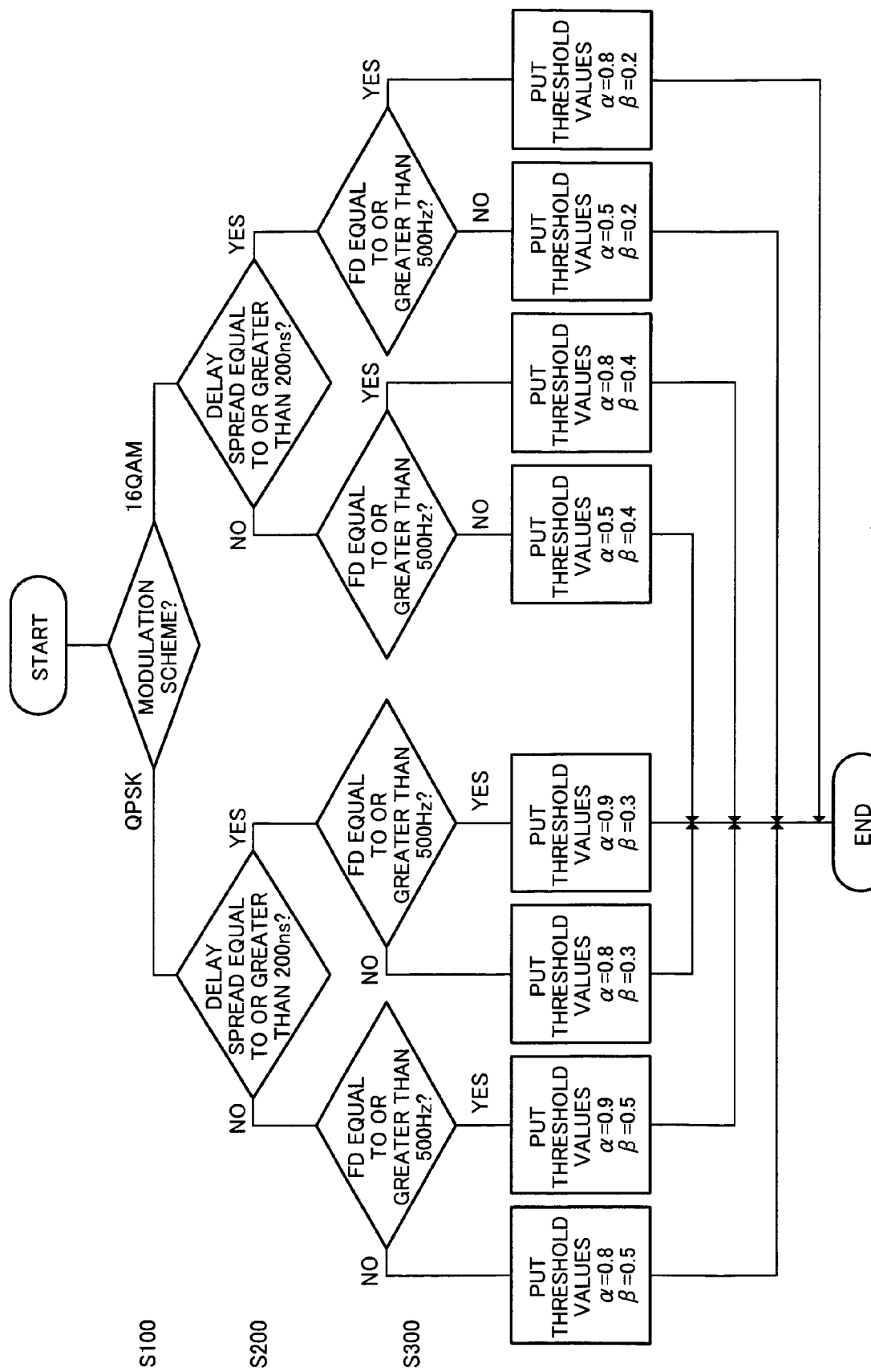
FIG. 5 is a flowchart showing processing for setting a threshold value for deciding spreading domain of Embodiment 1 of the present invention.

Specifically, decision of the spreading domain by spreading domain deciding section 111 is, for example, in accordance with the flowchart of FIG. 5. FIG. 5 is a flowchart illustrating processing of setting two threshold values $\alpha$ and $\beta$ used for deciding spreading domain. The threshold values $\alpha$ and $\beta$ are compared with a value obtained by dividing the number of codes multiplexed by a spreading factor. In the example of setting processing shown in FIG. 5, the threshold values $\alpha$ and $\beta$ are set in accordance with whether the modulation scheme is the QPSK or 16QAM (step S100), whether or not the delay spread is equal to or greater than 200 ns (step S200), and whether or not the Doppler frequency (FD) is equal to or more than 500 Hz (step S300).

For example, when the modulation scheme is the QPSK scheme, the delay spread is less than 200 ns, and FD is less than 500 Hz, the settings of threshold values $\alpha$ and $\beta$ are $\alpha=0.8$ and $\beta=0.5$. When the modulation scheme is the QPSK scheme, the delay spread is less than 200 ns, and FD is equal to or greater than 500 Hz, the settings of threshold values $\alpha$ and $\beta$ are $\alpha=0.9$ and $\beta=0.5$. When the modulation scheme is the QPSK scheme, the delay spread is equal to or greater than 200 ns, and the FD is less than 500 Hz, the settings of threshold values $\alpha$ and $\beta$ are $\alpha=0.8$ and $\beta=0.3$. When the modulation scheme is the QPSK scheme, the delay spread is equal to or greater than 200 ns, and the FD is equal to or greater than 500 Hz, the settings of threshold values $\alpha$ and $\beta$ are $\alpha=0.9$ and $\beta=0.3$. When the modulation scheme is the 16QAM scheme, the delay spread is less than 200 ns, and FD is less than 500 Hz, the settings of threshold values $\alpha$ and $\beta$ are $\alpha=0.5$ and $\beta=0.4$. When the modulation scheme is the 16QAM scheme, the delay spread is less than 200 ns, and FD is equal to or greater than 500 Hz, the settings of threshold values $\alpha$ and $\beta$ are $\alpha=0.8$ and $\beta=0.4$. When the modulation scheme is the 16QAM scheme, the delay spread is equal to or greater than 200 ns, and the FD is less than 500 Hz, the settings of threshold values $\alpha$ and $\beta$ are $\alpha=0.5$ and $\beta=0.2$. When the modulation scheme is the 16QAM scheme, the delay spread is equal to or greater than 200 ns, and the FD is equal to or greater than 500 Hz, the settings of threshold values $\alpha$ and $\beta$ are $\alpha=0.8$ and $\beta=0.2$.

The threshold values $\alpha$ and $\beta$ set in accordance with the flow described above are, for example, assigned to the table for deciding spreading direction shown in FIG. 6. According to the table of FIG. 6, when the number of codes multiplexed/ spreading factor are equal to or greater than the threshold vale α, IQ-separated spreading in both domains is decided not to be carried out (IQ-separated spreading in one domain is decided to be carried out), and assume that the spreading domain for both the Ich spreading chip and the Qch spreading chip are time domain (hereinafter referred to as a "time domain"). Namely, in this case, as the results of the IQ-separated spreading, the Ich spreading chip and the Qch spreading chip are both extended to the time domain and respectively arranged at a first region and a second region having different positions in the frequency domain.

Further, when the number of codes multiplexed/spreading factor are equal to or greater than β and less than threshold value α, IQ-separated spreading in both domain is decided to be carried out, and assume that the spreading domain of the Ich spreading chip is the time domain and the spreading domain of the Qch spreading chip is the frequency domain (hereinafter referred to as "frequency domain"), or the spreading domain of the Ich spreading chip is the frequency domain and the spreading domain of the Qch spreading chip is the time domain. Namely, in this case, as the results of the IQ-separated spreading, the Ich spreading chip and the Qch spreading chip are respectively arranged at a first region and a second region that extend in different domains between the time domain and the frequency domain.

Further, when the number of codes multiplexed/spreading factor is less than the threshold value β, IQ-separated spreading in both domains is decided not to be carried out (IQ-separated spreading in one domain is decided to be carried out), and assume that the spreading domain of both the Ich spreading chip and the Qch spreading chip is the frequency domain. Namely, in this case, as the results of the IQ-separated spreading, the Ich spreading chip and the Qch spreading chip are respectively arranged at a first region and a second region that both extend in the frequency domain and have different positions in the time domain.

In this way, since the spreading directions of the components are individually and variably decided according to, for example, the propagation path condition and modulation and coding scheme, it is possible to adaptively select spreading domain in which a more significant diversity effect is obtained.

Further, either of setting the spreading domain of the Ich spreading chip and the spreading domain of the Qch spreading chip to the same domain or setting the spreading domain of the spreading chip of the Ich component and the spreading domain of the Qch spreading chip to different domains is selected, so that it is possible to select between obtaining the same diversity effect for the Ich component and the Qch component, or obtaining a different diversity effect for the Ich component and the Qch component.

Further, as setting of spreading domain is carried out using a threshold value that changes only one of the spreading domain of the Ich spreading chip and the spreading domain of the Qch spreading chip, so that it is possible to maintain diversity effects obtained for one of the Ich component and Qch component, and change diversity effect obtained for the other.

In this embodiment, with regards to "the number of codes multiplexed/spreading factor" at the table described above, it is presumed that transmission power is the same per code multiplexed and that a spreading factor is the same per code multiplexed. The same table can also be used even when the transmission power and the spreading factor are different for each code. In this event, the calculation results of the following (equation 1) are substituted as the "the number of codes multiplexed/spreading factor".

[Equation 1]

$$\frac{\sqrt{\left(\frac{\text{sum of chip power after total code spreading}}{\text{chip power after own code spreading}}\right)}}{\text{own code spreading rate}} \quad (1)$$

Further, the threshold setting flow is not limited to the one described above. For example, in a case where another modulation scheme is used, and in a case where an error correction code is used and modulation and coding schemes having different coding rates exist, corresponding flows are provided respectively, and, by this means, the table described above can be used.

Further, spreading domain deciding section 111 may also decide spreading domain in accordance with the number of retransmission of the modulation symbols. For example, If, at the time of first transmission of a certain modulation symbol, the spreading domain of the Ich spreading chip is decided to be in the frequency direction, and the spreading domain of the Qch spreading chip is decided to be in the time domain, at the time of retransmission of that modulation symbol, the spreading direction of the Ich spreading chip is decided to be in the time domain, and the spreading direction of the Qch spreading chip is decided to be in the frequency domain. Further, when retransmission takes place after this, it is possible to change the spreading domain again. By carrying out this kind of control, it is possible to average the amount of interference the Ich component and the Qch component are individually subjected to.

S/P section 112 then converts the modulation symbol generated by modulation section 101 from serial to parallel.

Spreading section 113 then spreads the modulation symbol converted from serial to parallel by S/P section 112 by a predetermined spreading factor. By this means, spreading chips of the number corresponding to the spreading factor are generated. As a result of this spreading processing, the spreading chips constituting this modulation symbol are arranged in a two-dimensional region. Here, although the spreading factor for use may be a fixed value or variable value, in this embodiment, it is taken to be a fixed value in order to simplify the description.

IQ separating section 114 carries out IQ separation on the spreading chips constituting modulation symbols spread by spreading section 113. More specifically, the in-phase component of the spreading chip constituting the modulation symbol is the Ich spreading chip, and the quadrature component of the spreading chip constituting the modulation symbol is the Qch spreading chip. It is therefore possible to obtain the Ich spreading chip and Qch spreading chip in this way. The Ich spreading chip is then outputted to rearrangement section 115, and the Qch spreading chip is outputted to rearrangement section 116.

Rearrangement section 115 acquires control information. Further, the Ich spreading chip inputted in accordance with the control information is rearranged in the two-dimensional region. Specifically, rearrangement processing is carried out by changing the arrangement domains of the Ich spreading chip in accordance with spreading domain information indicated in the control information. Further, when carrying out the rearrangement processing, arrangement position information indicated in the control information is referred to. Moreover, rearrangement section 115 also carries out rearrangement processing to move the processing target Ich spreading chip to a region for which the separation distance (mutual separation distance) from the Qch spreading chip belonging to the same modulation symbol as the processing target Ich spreading chip is larger. This kind of rearrangement processing is also carried out in accordance with arrangement position information indicated in the control information. Further, chip interleaving to randomly arrange the Ich spreading chip at the two-dimensional region depending on the acquired control information may also be carried out. In this case, it is possible to obtain a larger spreading diversity gain. Moreover, there are also cases where rearrangement processing is not carried out by rearrangement section 115 depending on the acquired control information. As described above, when rearrangement processing is carried out so as to make the mutual separation distance of the Ich spreading chip and the Qch spreading chip larger, or when chip interleaving is carried out so as to randomly arrange the Ich spreading chip, it is possible to increase mutual independency between the Ich spreading chip and the Qch spreading chip, and allow the Ich component and the Qch component to be subjected to different fading.

In this embodiment, the arrangement position of the Ich spreading chip is determined as a result of processing at the S/P section 112, spreading section 113, and rearrangement section 115. The rearranged Ich spreading chip is outputted to IQ combining section 103.

Rearrangement section 116 acquires control information. Further, it is also possible for the Qch spreading chip inputted in accordance with the control information to be rearranged at the two-dimensional region. Specifically, rearrangement processing is carried out by changing the arrangement domain of the Qch spreading chip in accordance with spreading domain information indicated in the control information. Further, when carrying out the rearrangement processing, arrangement position information indicated in the control information is referred to. Moreover, rearrangement section 116 also carries out rearrangement processing to move the processing target Qch spreading chip to a region for which the separation distance from the Ich spreading chip belonging to the same modulation symbol as the processing target Qch spreading chip is larger. Namely, the Ich spreading chip and the Qch spreading chip are arranged at more distanced regions. This kind of rearrangement processing is also carried out in accordance with arrangement position information indicated in the control information. Further, it is also possible to carry out interleaving to randomly arrange the Qch spreading chip at the two-dimensional region depending on the acquired control information. In this case, it is possible to obtain a larger spreading diversity gain. Moreover, there are also cases where rearrangement processing is not carried out by rearrangement section 116 depending on the acquired control information. As described above, when rearrangement processing is carried out so as to make the mutual separation distance of the Ich spreading chip and the Qch spreading chip larger, or when chip interleaving is carried out so as to randomly arrange the Ich spreading chip, it is possible to increase mutual independency between the Ich spreading chip and the Qch spreading chip, and allow the Ich component and the Qch component to be subjected to different fading.

In this embodiment, the arrangement position of the Qch spreading chip is determined as a result of processing at the S/P section 112, spreading section 113, and rearrangement section 116. The rearranged Qch spreading chip is outputted to IQ combining section 103.

On the other hand, wireless receiving apparatus 150 shown in FIG. 2B has: antenna 151 that receives wireless signals containing data (receiving data) for the subject apparatus transmitted from wireless transmission apparatus 100; GI removal section 152 that removes GI's inserted in predetermined positions of the received data subjected to predetermined wireless reception processing; FFT section 153 that carries out FFT on the received data after GI removal; channel estimation section 154 that carries out channel estimation using reception data after FFT and assigns weights to received data after FFT per subcarrier, control information extracting section 155 that extracts control information from received data (after FFT and weight assignment in this embodiment) after FFT; IQ separating section 156 that separates received data after control information extraction into an Ich spreading chip and Qch spreading chip; IQ-separated despreading section 157 that acquires modulation symbols from the Ich spreading chip and Qch spreading chip after IQ separation based on the control information; and demodulation section 158 that demodulates data from acquired modulation symbols by carrying out mapping taking phase rotation carried out at wireless transmission apparatus 100 into consideration.

IQ-separated despreading section 157 has despreading direction deciding section 161, rearrangement sections 162 and 163, IQ combining section 164, despreading section 165 and parallel serial conversion (P/S) section 166.

Despreading direction deciding section 161 decides despreading directions and changes in arrangement positions for the Ich spreading chip and Qch spreading chip based on control information extracted by control information extracting section 155. The decided despreading domain and changes in arrangement positions are reported to rearrangement section 162 and 163.

Rearrangement section 162 changes the arrangement of the Ich spreading chip in the two-dimensional region in accordance with the reported despreading direction and changes in arrangement positions. By means of this change in arrangement, the position of the Ich spreading chip is restored to the state before rearrangement by rearrangement section 115 of wireless transmission apparatus 100.

Rearrangement section 163 changes the arrangement of the two-dimensional region of the Qch spreading chip in accordance with the reported despreading domain and changes in arrangement positions. By means of this change in arrangement, the position of the Qch spreading chip is restored to the state before rearrangement by rearrangement section 116 of wireless transmission apparatus 100.

IQ combining section 164 then carries out IQ combining on the Ich spreading chip and Qch spreading chip for which rearrangement section 162 and 163 changes the arrangement, respectively.

Despreading section 165 despreads the spreading chips after IQ combining based on the spreading factor used at wireless transmission apparatus 100, and generates modulation symbols. The generated modulation symbols are outputted to P/S section 166.

P/S section 166 converts the generated modulation symbol from parallel to serial.

In this embodiment, although a configuration is described where a wireless signal is received using one antenna element (namely, antenna 151) as the configuration for wireless receiving apparatus 150, a configuration may also adopted where a wireless signal is received using two or more antenna elements.

Figure 7:
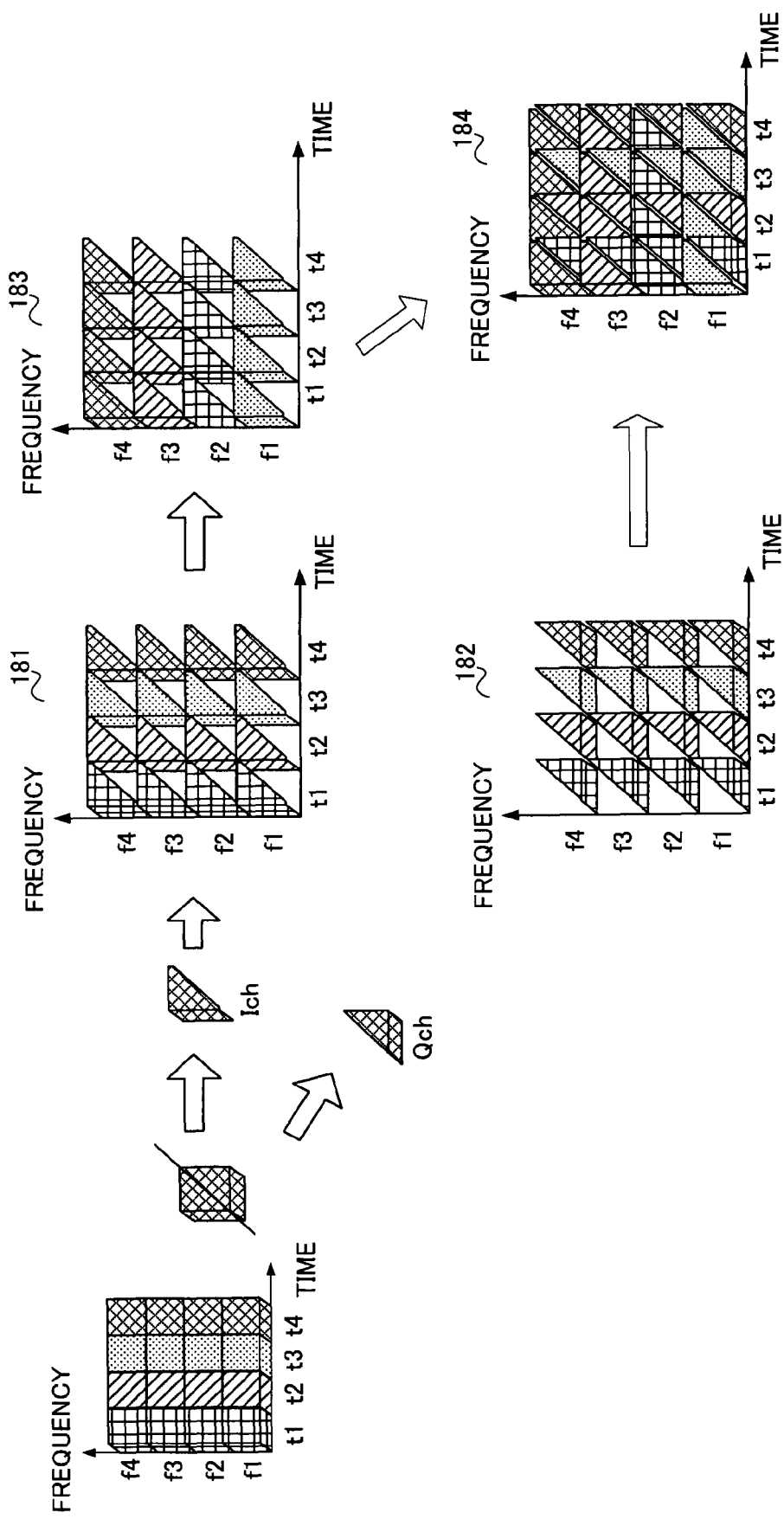
FIG. 7 is a view illustrating IQ-separated spreading operations of Embodiment 1 of the present invention.

Next, the IQ-separated spreading operations in wireless transmission apparatus 100 having the above configuration will be described using FIG. 7.

First, modulation symbols are spread at spreading section 113. Here, spreading factor SF=4. Further, in this example, four spreading chips constituting one modulation symbol are spread in the frequency domain. The three modulation symbols following on from this modulation symbol are then similarly spread in the frequency domain. The spreading domain by spreading section 113 may also be the time domain.

Next, IQ separation is then carried out at IQ separating section 114. The real part of each spreading chip then constitutes an Ich spreading chip, and the imaginary part of each spreading chip then constitutes a Qch spreading chip. In FIG. 7, two-dimensional arrangement 181 for the Ich spreading chip after IQ separation and two-dimensional arrangement 182 for the Qch spreading chip after IQ separation are shown.

Rearrangement of the Ich spreading chip and Qch spreading chip is then carried out at rearrangement sections 115 and 116, respectively. Here, assume that the results of spreading domain deciding processing at spreading domain deciding section 111 are such that time domain spreading is assigned to the Ich component and frequency domain spreading is assigned to the Qch component. In this example, Qch spreading chip is already arranged in a region extending in the frequency domain, and, therefore, change of the arrangement domain of the Qch spreading chip is not carried out at rearrangement section 116. On the other hand, at rearrangement section 115, the arrangement domain of the Ich spreading chip is changed from the frequency domain to the time domain. As a result, as shown in two-dimensional arrangement 183, Ich spreading chip is arranged in a region extending in the time domain. Further, at this time, positions at which a plurality of Ich spreading chips belonging to the same modulation symbol are arranged on the time domain are in accordance with arrangement position information indicated in control information from spreading domain deciding section 111. As shown above, the Ich component and Qch component are spread individually.

Although not shown here, at rearrangement sections 115 and 116, processing of moving the Ich spreading chips and/or the Qch spreading chips to a region where the mutual separation distance between the Ich spreading chips and the Qch spreading chips belonging to the same modulation symbol is larger, may be carried out.

At IQ combining section 103, the Ich spreading chips and the Qch spreading chips are subjected to IQ combining after rearrangement processing at rearrangement sections 115 and 116. A two-dimensional arrangement 184 for a signal after combining is shown in FIG. 7.

Next, the effects of IQ-separated spreading of this embodiment will be described in detail. Here, to compare IQ-separated spreading of this embodiment with two-dimensional spreading without IQ-separated spreading, an IQ-separated spreading example shown in FIG. 8 and a two-dimensional spreading example shown in FIG. 9 will be described. Further, an example of a propagation path condition that is a precondition for a comparative description is shown in FIG. 10.

Figure 8:
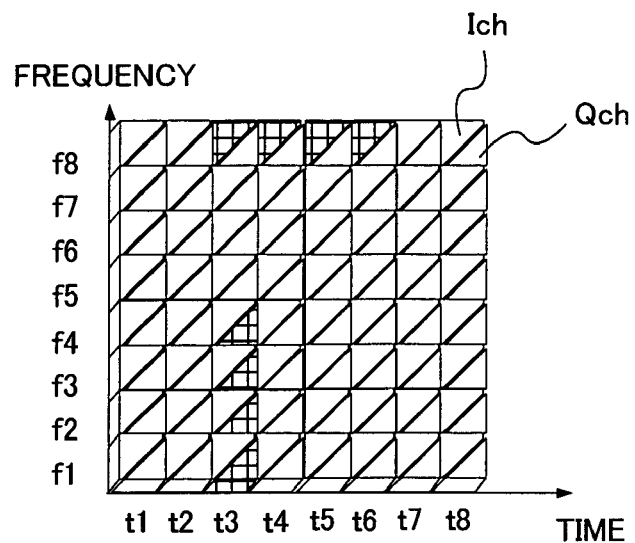
FIG. 8 is a view showing an example of IQ-separated spreading of Embodiment 1 of the present invention.

In the IQ-separated spreading example shown in FIG. 8, one modulation symbol is spread four times, is subjected to IQ separation, is arranged in regions ((f8, t3), (f8, t4), (f8, t5), (f8, t6)) where the Ich spreading chip extends in the time domain, and is arranged in regions ((f1, t3), (f2, t3), (f3, t3), (f4, t3)) where the Qch spreading chip extends in the frequency domain. Further, in this example, the Ich spreading chip and Qch spreading chip are arranged spaced apart from each other so that the mutual separation distance is 0 at minimum (counted per chip unit) is 3 at maximum in the time domain, and is 4 at minimum and 7 at maximum in the frequency domain. Taking into consideration the maximum mutual separation distance, the modulation symbols are arranged in a substantially broad range, and, therefore, the diversity effect is large.

Figure 9:
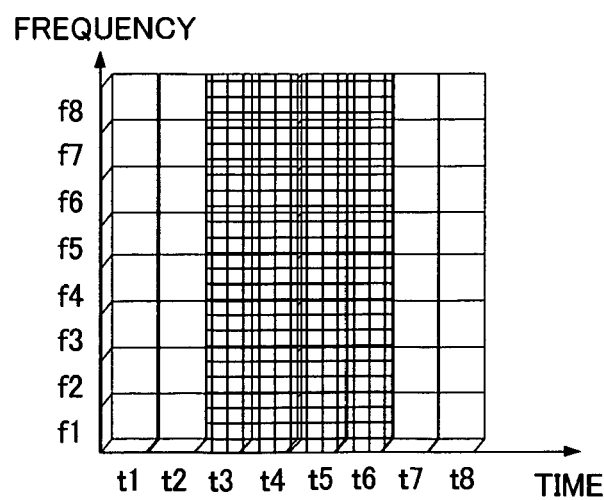
FIG. 9 is a view showing an example of two-dimensional spreading without IQ separation used in comparison with the example of IQ separation of FIG. 8.
Figure 10:
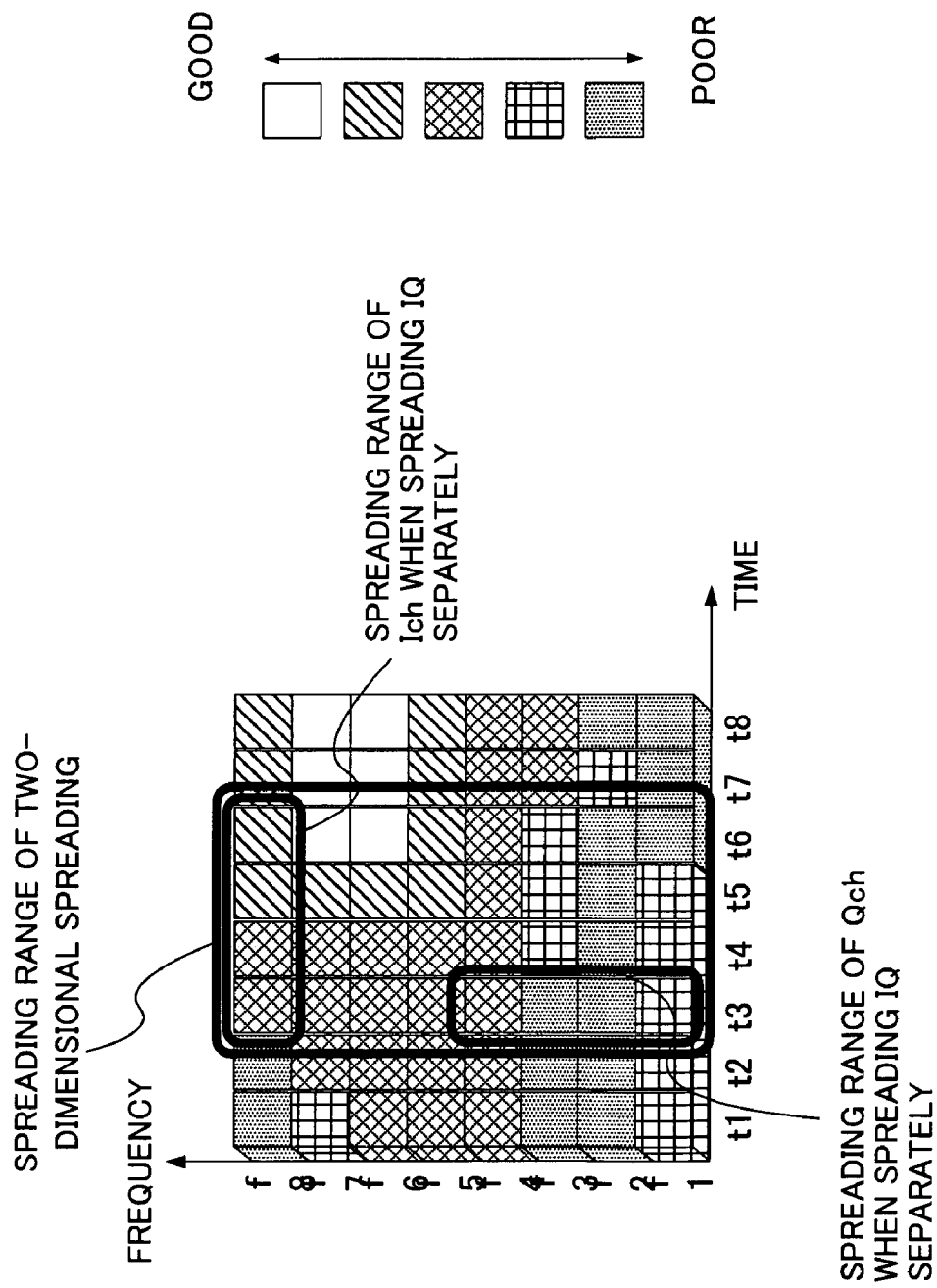
FIG. 10 is a view showing an example of a propagation path condition to illustrate a comparison with the example of IQ-separated spreading of FIG. 8 and the example of two-dimensional spreading of FIG. 9.

When trying to realize diversity effects of the same level as this IQ-separated spreading example using two-dimensional spreading without IQ separation, as shown in FIG. 9, it is necessary to spread one modulation symbol 32 times, and arrange spreading chips in a range from t3 to t6 on the time domain and in a range from f1 to f8 on the frequency domain.

In the IQ-separated spreading example, when the Qch spreading chip is shifted from position t3 to position t1, and the Ich spreading chip is shifted from t5 to t8, it is possible to obtain the same spreading diversity effect as for the case of carrying out spreading sixty-four times in the two-dimensional spreading without IQ separation, thereby further improving the diversity effect.

Figure 11:
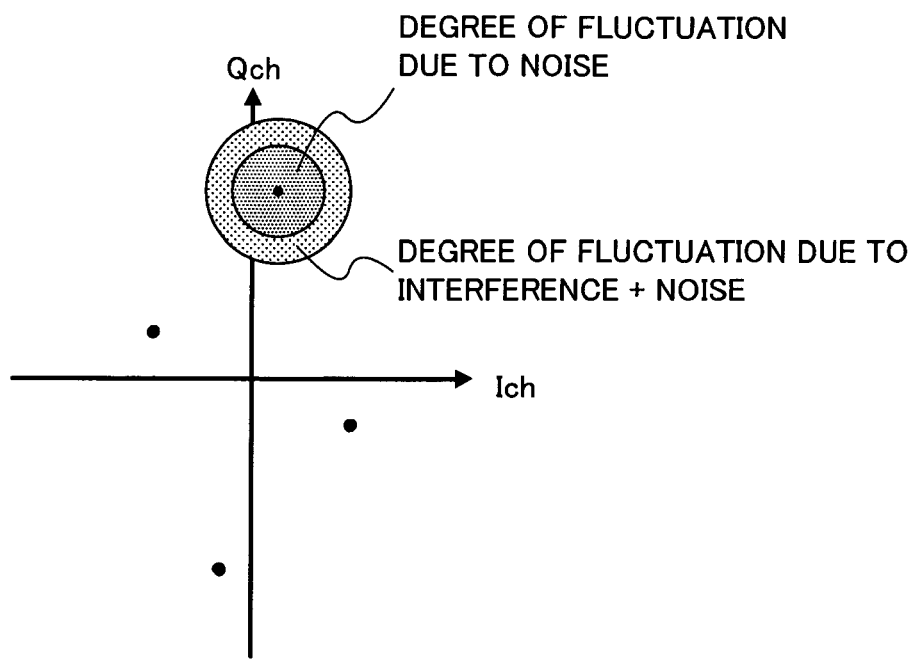
FIG. 11 is a view showing the degree of fluctuations of reception constellation in the example of the IQ-separated spreading of FIG. 8.

Here, the example of propagation path condition of FIG. 10 is referred to. The Ich spreading chip of IQ-separated spreading is arranged in a region where reception sensitivity is very poor, and reception SNR (Signal to Noise Ratio) after despreading is therefore low. However, the fluctuation width of the reception sensitivity within this region is small. As a result, interference power due to destroying orthogonality is therefore comparatively small. On the other hand, Qch spreading chip of IQ-separated spreading is arranged in a region where reception sensitivity is very good, and SNR after despreading is therefore high. Also, the reception sensitivity fluctuation width within this region is small, and interference power due to the destroying orthogonality is therefore comparatively small. As a result, the reception constellation after IQ-separated despreading at the receiver side (wireless receiving apparatus 150) is as shown, for example, in FIG. 11 (where the QPSK scheme is taken as an example). In FIG. 11, the inner circle of two circles shows the degree of fluctuations of a constellation due to only noise, and the outer circle shows the degree of fluctuations due to interference and noise.

Figure 12:
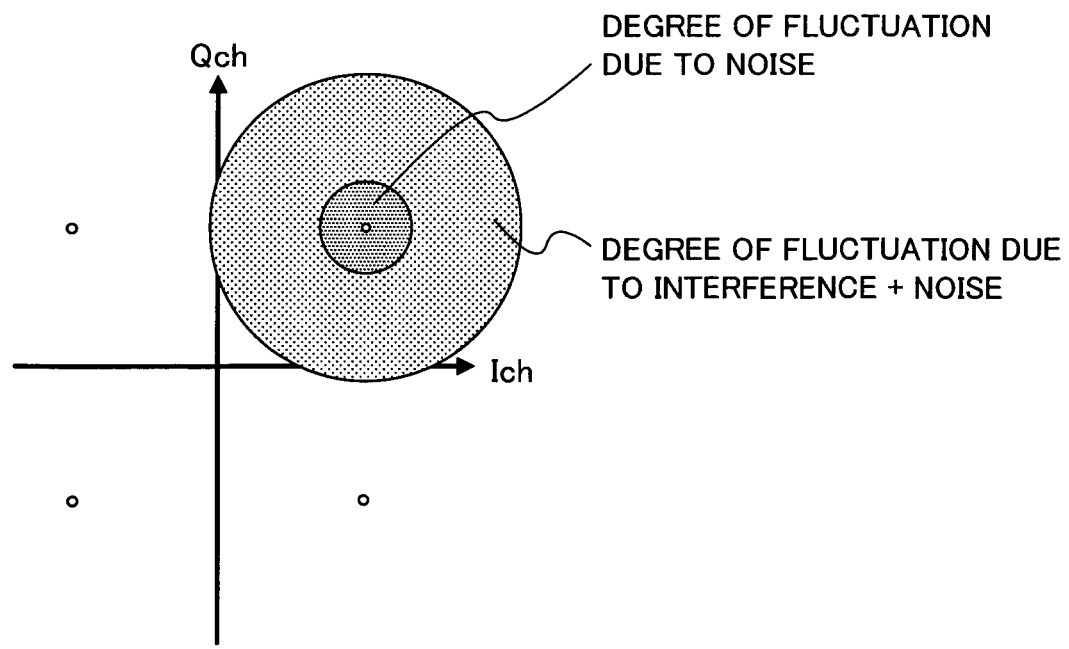
FIG. 12 is a view showing the degree of fluctuations of reception constellation in the example of the two-dimensional spreading of FIG. 9.

FIG. 10 is now referred to again. As the spreading chip of the two-dimensional spreading is arranged at all of the coordinates in a broad range, the reception SNR after despreading is average. However, the fluctuation width of the reception sensitivity in this region is very large. As a result, interference power due to destroying orthogonality is large. Accordingly, the reception constellation after despreading on the receiving side is as shown, for example, in FIG. 12. In FIG. 12, the inner circle of two circles shows the degree of fluctuations of a constellation due to only noise, and the outer circle shows the degree of fluctuations due to interference and noise.

As is clear from comparing FIG. 11 with FIG. 12, in a case of IQ-separated spreading, interference power is reduced, compared with the case of two-dimensional spreading without IQ separation. When "the number of codes multiplexed/spreading factor" is large, differences in the degree of fluctuation are more obvious, and the effect due to IQ-separated spreading increases. It is therefore possible to improve BER (Bit Error Rate) by using IQ-separated spreading of this embodiment.

When spreading is carried out using a large spreading factor in two-dimensional spreading without IQ separation, it becomes difficult to maintain orthogonality as described above. For this reason, in most cases, the spreading factor is kept low. Compared to this, in a case of IQ-separated spreading of this embodiment, even if modulation symbol spreading is carried out using a low spreading factor, if the Ich spreading chip spreading factor and the Qch spreading chip spreading factor are summed, the actual spreading factor becomes high.

In this way, according to this embodiment, on the transmission side, the Ich spreading chip and the Qch spreading chip are arranged in a region extending in a spreading domain set for the Ich component and Qch component individually, and on the receiving side, the modulation symbols are obtained from a signal comprised of the Ich spreading chip and the Qch spreading chip arranged in regions extending in a spreading domain set for the Ich component and the Qch component individually, so that it is possible to reduce interference power due to destroying orthogonality compared to two-dimensional spreading without IQ separation, obtain a spreading diversity effect that is the same as at a high spreading factor at a low spreading factor, maintain interference resistance obtained by spreading, obtain at least one of the frequency diversity effect and time diversity effect, and improve reception error rate at the receiver.

Further, in this embodiment, a case is mainly described where the Ich spreading chip and Qch spreading chip are arranged individually in two regions extending in different domains. However, this is by no means limited to that case, and it is also possible to realize the same operational effects in the case where the Ich spreading chip and the Qch spreading chip are arranged individually at two regions extending in the same spreading domain.

Figure 13:
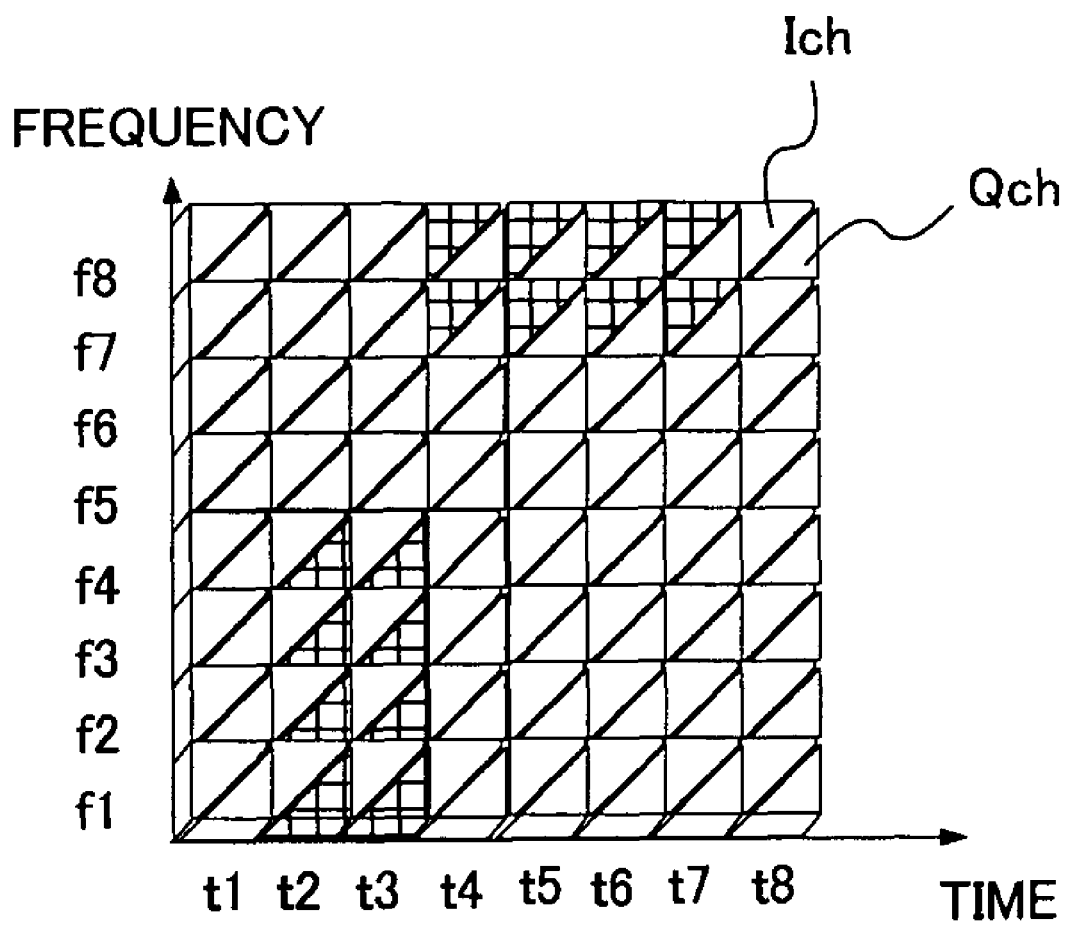
FIG. 13 is a view showing another example of IQ-separated spreading of Embodiment 1 of the present invention.

In this embodiment, although a case has been described with this embodiment where the Ich spreading chip is spread in one domain alone and the Qch spreading chip is spread in the other domain alone, the separate arrangement method is by no means limited to this. For example, as shown in FIG. 13, regarding the Ich spreading chip, the frequency domain spreading factor may also be 4 and the time domain spreading factor may also be 2, and regarding the Qch spreading chip, the frequency domain spreading factor may also be 2 and the time domain spreading factor may also be 4. Namely, the Ich component and Qch component may also be individually arranged after spreading in two-dimensions. In this case also, it is possible to realize the operation effect the same as described above.

Embodiment 2

Figure 14A:
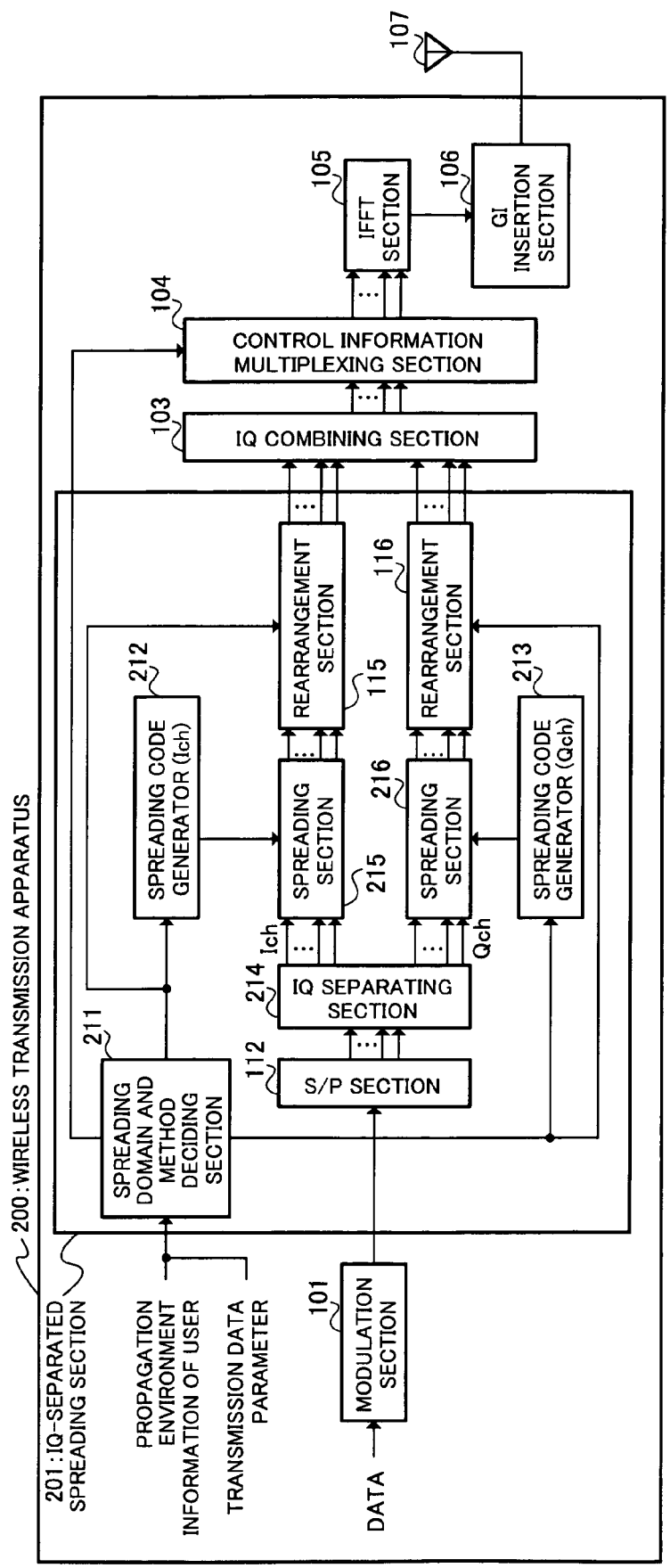
FIG. 14A is a block view showing a configuration for wireless transmission apparatus of Embodiment 2 of the present invention.
Figure 14B:
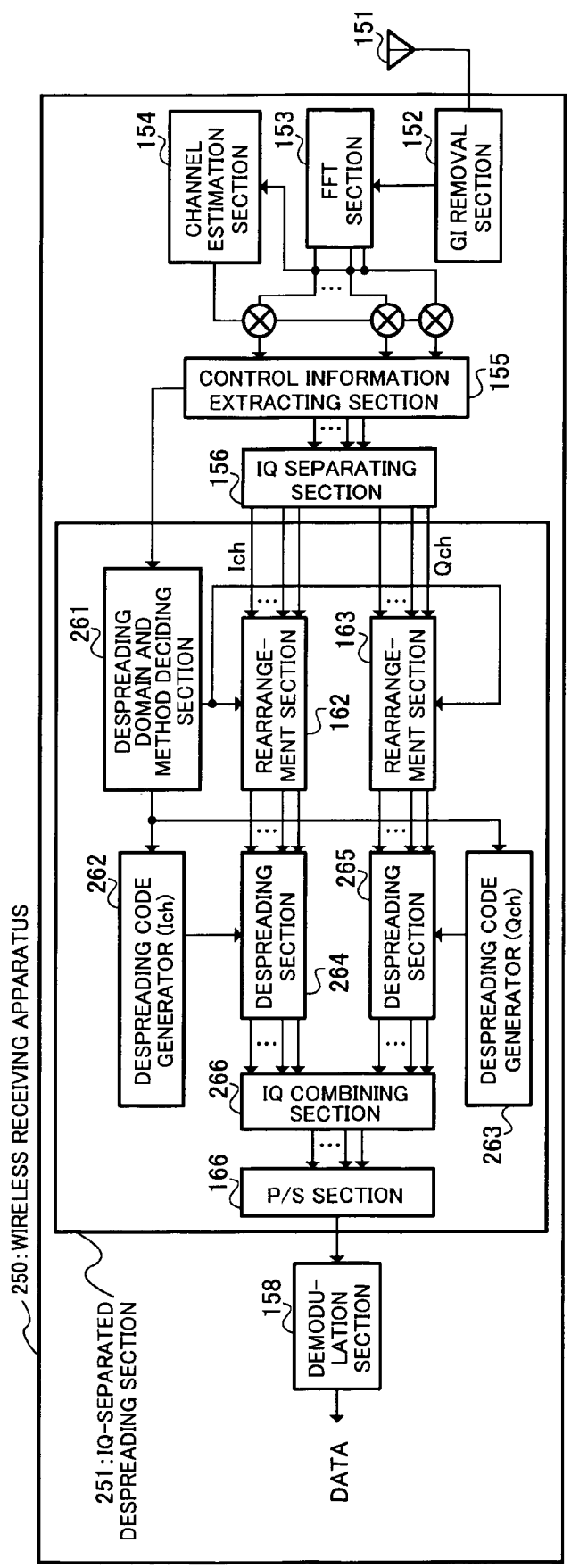
FIG. 14B is a block view showing a configuration for wireless receiving apparatus of Embodiment 2 of the present invention.

FIG. 14A and FIG. 14B are block views showing a wireless transmission apparatus and wireless receiving apparatus of Embodiment 2 of the present invention, respectively. Apparatuses described in this embodiment have a basic configuration the same as that described in Embodiment 1, and components that are the same are assigned the same reference codes, and their detailed descriptions will be omitted.

Wireless transmission apparatus 200 shown in FIG. 14A has a configuration where IQ-separated spreading section 201 is provided in place of IQ-separated spreading section 102 described in Embodiment 1. IQ-separated spreading section 201 has S/P section 112, rearrangement sections 115 and 116 described in Embodiment 1, and, in addition, has spreading domain and method deciding section 211, spreading code generating sections 212 and 213, IQ separating section 214, and spreading sections 215 and 216.

At IQ-separated spreading section 201 of wireless transmission apparatus 200 of this embodiment, modulation symbols converted from serial to parallel by S/P section 112 are spread as an Ich component and Qch component, respectively, by spreading section 215 and spreading section 216 after IQ separation by separating section 214. The Ich spreading chip and Qch spreading chip generated by spreading are outputted to rearrangement sections 115 and 116, respectively.

Further, spreading domain and method deciding section 211 carries out the same operations as spreading domain deciding section 111 described in Embodiment 1, and also decides the spreading factors for the Ich component and Qch component with the same technique as in those operations. More preferably, spreading factors in the time domain and the frequency domain for the Ich component and spreading factors in the time domain and frequency domain of the Qch component are decided. Spreading domain and method deciding section 211 then outputs information indicating the decided spreading domains, arrangement positions and spreading factors as control information to spreading code generators 212 and 213, rearrangement sections 115 and 116, and control information multiplexing section 104.

Further, spreading code generator 212 corresponds to the Ich component. On the other hand, spreading code generator 213 corresponds to the Qch component. Spreading code generators 212 and 213 generate a spreading code for Ich component and a spreading code for Qch component in accordance with the inputted control information. These spreading codes are mutually orthogonal.

Further, wireless receiving apparatus 250 shown in FIG. 14B has a configuration where IQ-separated despreading section 251 is provided in place of IQ-separated despreading section 157 described in Embodiment 1. IQ-separated despreading section 251 has the rearrangement sections 162, 163 and P/S section 166 described in Embodiment 1, and also has despreading domain deciding section 261, despreading code generators 262, 263, despreading sections 264, 265, and IQ combining section 266.

At IQ-separated despreading section 251 of wireless receiving apparatus 250 of this embodiment, Ich spreading chip and Qch spreading chip rearranged by rearrangement sections 162 and 163 are despread by despreading sections 264 and 265, respectively, and the despreading results are then subjected to IQ-combining. Modulation symbols generated by IQ combining are then outputted to P/S section 166.

Further, despreading domain and method deciding section 261 carries out the same operations as despreading domain deciding section 161 described in Embodiment 1, and also obtains information relating to the spreading factors for the Ich component and Qch component with the same technique as in those operations. The acquired control information is outputted to rearrangement section 162 and 163, and to despreading code generators 262 and 263 in the same manner.

Further, despreading code generator 262 corresponds to the Ich component. On the other hand, despreading code generator 263 corresponds to the Qch component. Despreading code generators 262 and 263 generate a spreading code for despreading the Ich component and a spreading code for despreading the Qch component in accordance with inputted control information. These spreading codes are mutually orthogonal.

Figure 15:
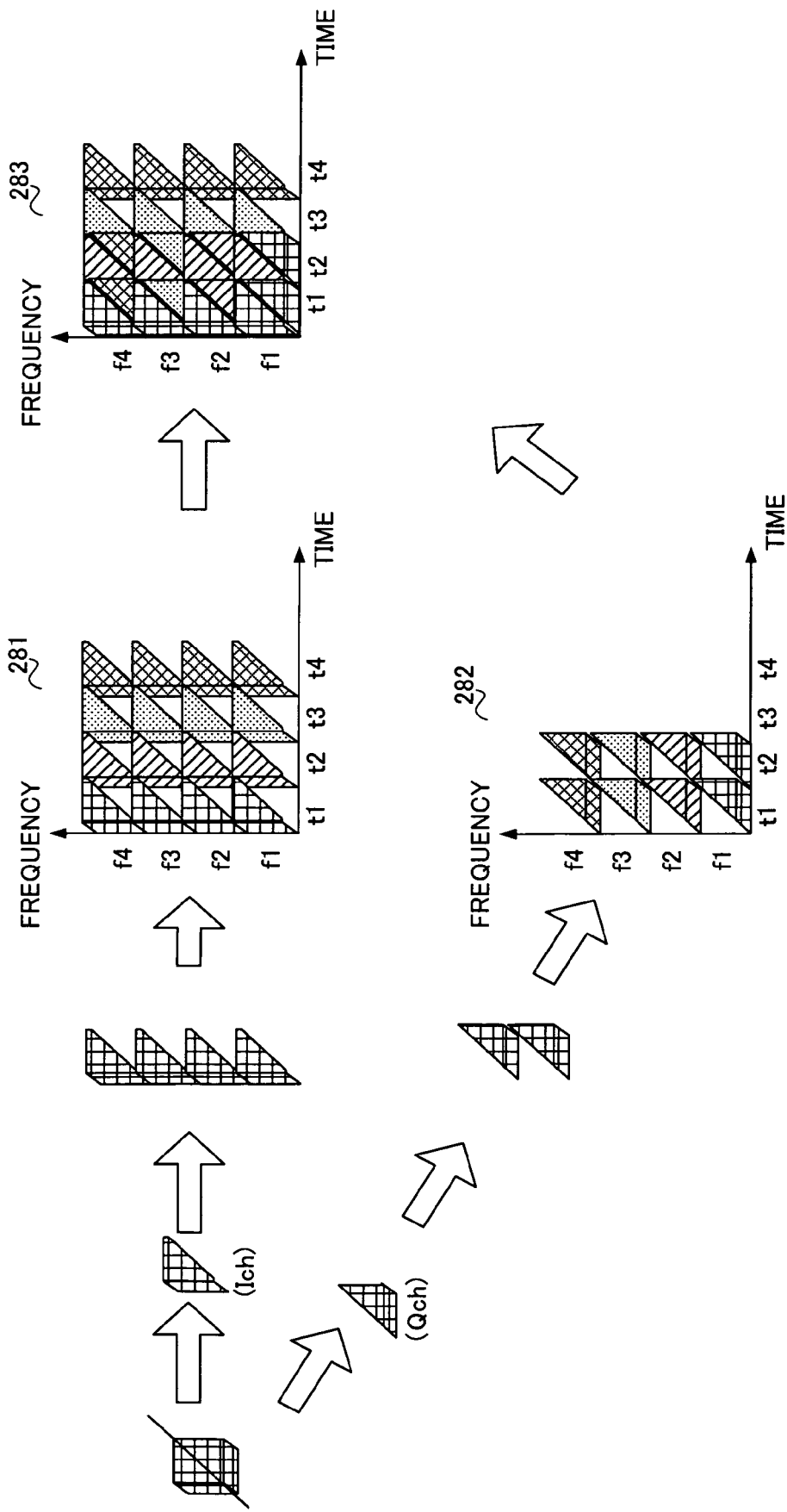
FIG. 15 is a view illustrating an IQ-separated spreading operation of Embodiment 2 of the present invention.

Next, the IQ-separated spreading operations in wireless transmission apparatus 200 having the above configuration will be described using FIG. 15.

First, at IQ separating section 214, the modulation symbol is subjected to IQ separation. The Ich component after IQ separation is spread at spreading section 215. In this example, the spreading factor is 4. Further, the Qch component after IQ separation is spread at spreading section 216. In this example, the spreading factor is 2. Here, assume that, as a result of the spreading domain and spreading method deciding processing at spreading domain and method deciding section 211, spreading in frequency domain s is assigned to the Ich component and time domain spreading is assigned to the Qch component. In this case, the frequency domain is provided with a larger spreading factor. These kinds of settings are adopted when diversity effect obtained in the frequency domain is expected to be larger than in the time domain.

Rearrangement of the Ich spreading chip and Qch spreading chip is then carried out at rearrangement sections 115 and 116, respectively. In this case, at rearrangement section 115, the Ich spreading chip is arranged in a region extending in a frequency domain, and at rearrangement section 116, a Qch spreading chip is arranged in a region extending in a time domain. FIG. 15 shows two-dimensional arrangement 281 for Ich spreading chips when four modulation symbols are processed and two-dimensional arrangement 282 for Qch spreading chips when the same number of modulation symbols is processed. As described above, the Ich spreading chip and the Qch spreading chip are arranged individually.

Although not shown here, at rearrangement sections 115 and 116, processing may also be carried out where at least one of Ich spreading chips and Qch spreading chips is moved to a region where the mutual separation distance between Ich spreading chips and Qch spreading chips belonging to the same modulation symbol is large.

At IQ combining section 103, Ich spreading chips and Qch spreading chips are subjected to IQ-combining after rearrangement processing at rearrangement sections 115 and 116. Two-dimensional arrangement 283 for a signal after combining is shown in FIG. 15.

In this way, according to this embodiment, the spreading factors for the Ich component and Qch component are set individually, so that it is possible to increase the freedom degree of arrangement of modulation symbols in a two-dimensional region. For example, it is possible to set a spreading factor in a spreading domain where a large diversity effect is not anticipated to be small, and set a spreading factor in a spreading domain where a larger diversity effect is obtained to be large.

Embodiment 3

Figure 16A:
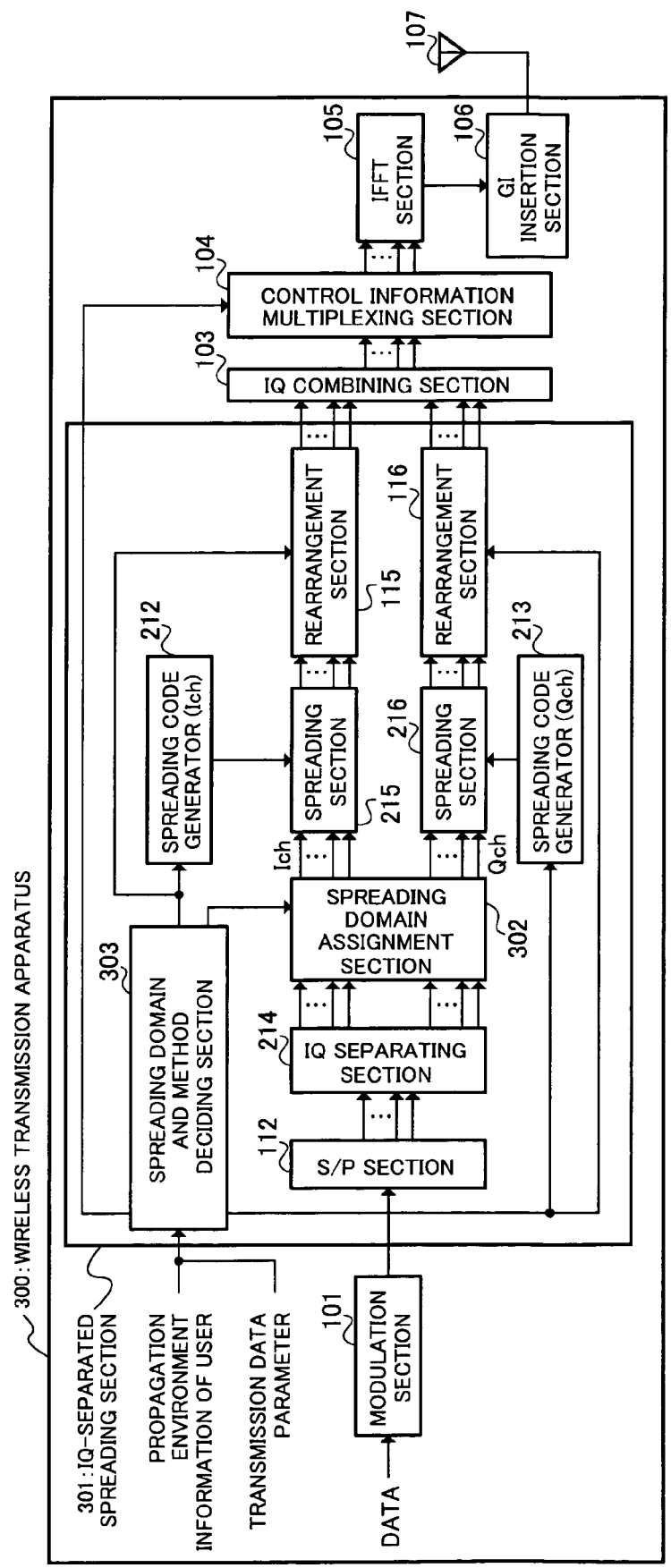
FIG. 16A is a block view showing a configuration for wireless transmission apparatus of Embodiment 3 of the present invention.
Figure 16B:
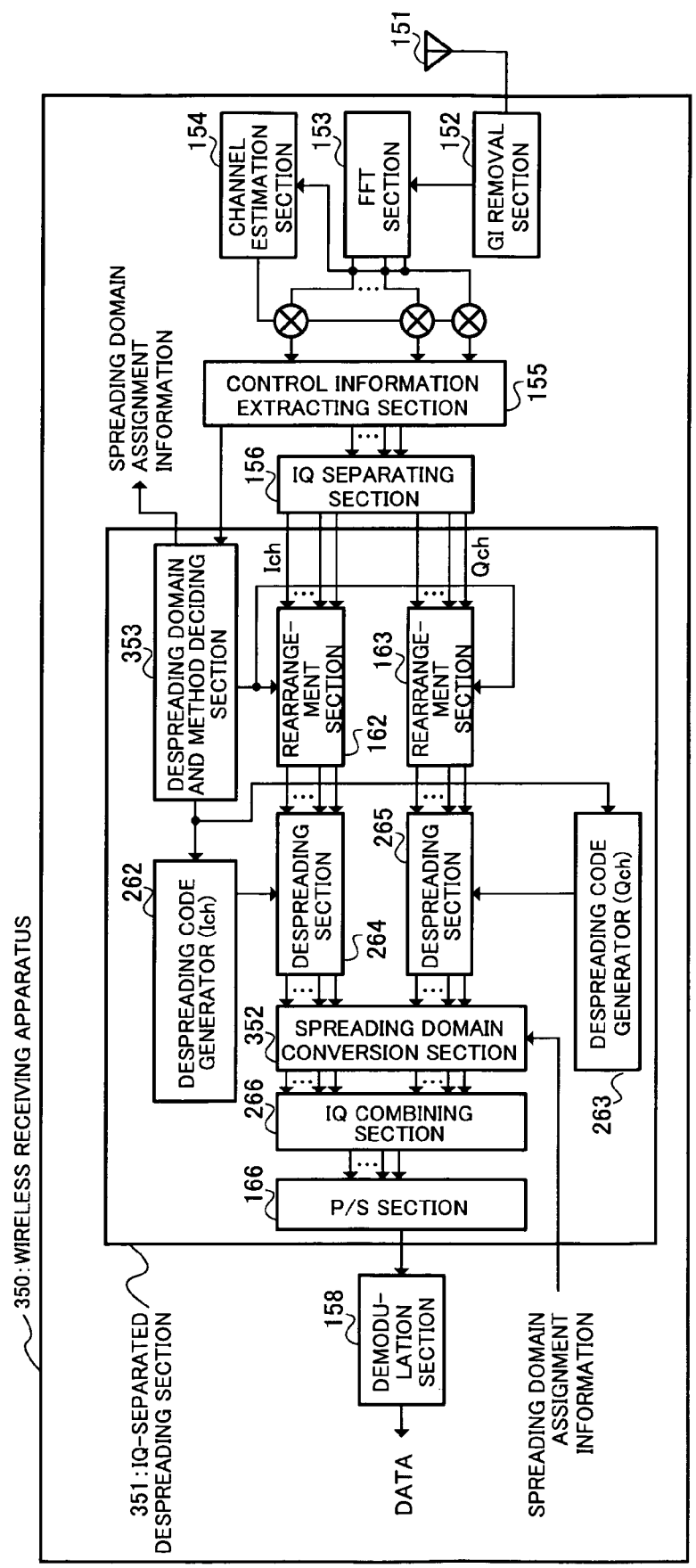
FIG. 16B is a block view showing a configuration for wireless receiving apparatus of Embodiment 3 of the present invention.

FIG. 16A and FIG. 16B are block views showing a wireless transmission apparatus and wireless receiving apparatus of Embodiment 3 of the present invention. Apparatuses described in this embodiment have a basic configuration the same as that described in Embodiment 2, and components that are the same are assigned the same reference codes, and their detailed descriptions will be omitted.

Wireless transmission apparatus 300 shown in FIG. 16A has a configuration where IQ-separated spreading section 301 is provided in place of IQ-separated spreading section 201 described in Embodiment 2. IQ-separated spreading section 301 has a configuration where spreading domain assignment section 302 is added to IQ-separated spreading section 201, and spreading domain and method deciding section 303 is provided in place of spreading domain and method deciding section 211. Further, wireless receiving apparatus 350 shown in FIG. 16B has a configuration where IQ-separated despreading section 351 is provided in place of IQ-separated despreading section 251 described in Embodiment 1. IQ-separated despreading section 351 has a configuration where spreading domain conversion section 352 is added to IQ-separated despreading section 251, and despreading domain and method deciding section 353 is provided in place of spreading domain and method deciding section 261.

At wireless transmission apparatus 300, spreading domain and method deciding section 303 carries out the same operation as spreading domain and method deciding section 211 described in Embodiment 2. Spreading domain and method deciding section 303 then outputs information indicating the decided spreading domain, arrangement positions and spreading factors as control information to spreading code generators 212 and 213, rearrangement sections 115 and 116, control information multiplexing section 104 and spreading domain assignment section 302.

Spreading domain assignment section 302 carries out assignment of the spreading domain for the Ich components and the Qch components from IQ separating section 214 based on the inputted control information. For example, part of one of the Ich components and the Qch components is converted to another component. Assignment of spreading domain will be described later in detail. Spreading domain assignment information indicating contents of spreading domain assignment is preferably generated. This information may be generated by spreading domain assignment section 302 or generated by spreading domain and method deciding section 303. Also, by allowing spreading domain assignment information to be contained in the control information, the spreading domain assignment information is preferably multiplexed on transmission data and reported to wireless receiving apparatus 350.

At wireless receiving apparatus 350, despreading domain and method deciding section 353 carries out the same operations as despreading domain deciding section 261 described in Embodiment 2, and outputs spreading domain assignment information contained in the control information to spreading domain conversion section 352.

Spreading domain conversion section 352 carries out conversion of the assigned spreading domain based on spreading domain assignment information. Specifically, information converted from one component to another component is returned to the original component by spreading domain assignment section 302. The Ich component and Qch component after spreading domain conversion are outputted to IQ combining section 266.

Figure 17:
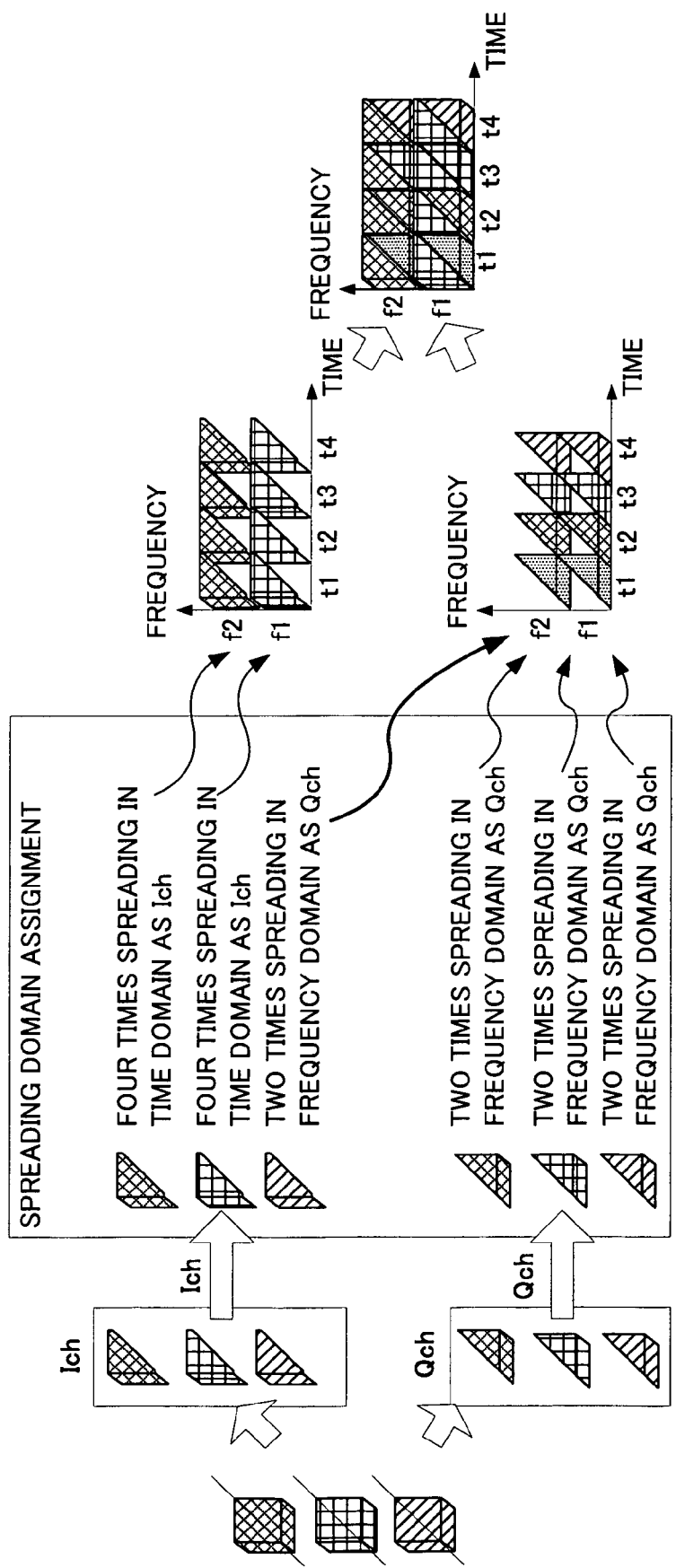
FIG. 17 is a view illustrating a spreading domain assignment operation of Embodiment 3 of the present invention.

Next, the spreading domain assignment operations at spreading domain assignment section 302 of wireless transmission apparatus 300 having the above configuration will be described. FIG. 17 is a view showing an example of spreading domain assignment.

In FIG. 17, an example is taken where there is a region worth of four chips (space capable of being mapped) in a time domain and a region worth of two chips (space capable of being mapped) in a frequency domain. An example is also taken where four times spreading of the Ich spreading chips in the time domain and two times spreading of the Qch spreading chips in the frequency domain are decided.

Now, assume that three modulation symbols are subjected to IQ separation. As a result, the Ich components are three, and the Qch component are three. Here, taking the size of the region in each domain into consideration, one of the three generated Ich components is decided to be handled as a Qch component. Namely, one Ich component is spread two times in the frequency domain as a Qch.

When component conversion is carried out, the converted component is subjected to phase rotation by ninety degrees. In this example, of the three Ich components, one is subjected to phase rotation by ninety degrees. Namely, an Ich signal is converted to a Qch signal. At spreading sections 215 and 216, the two Ich components and four Qch components obtained as the results of this conversion are spread at corresponding spreading factors (four times or two times), respectively. In this way, it is possible to spread the two Ich components four times in the time domain and carry out mapping, and spread the four Qch components two times in the frequency domain and carry out mapping.

In this way, according to this embodiment, part of one of the Ich component and Qch component is converted to another component, and the Ich component and Qch component subjected to conversion are spread by corresponding spreading factors, so that it is possible to further increase the freedom degree in arranging modulation symbols in a two-dimensional region.

Embodiment 4

Figure 18:
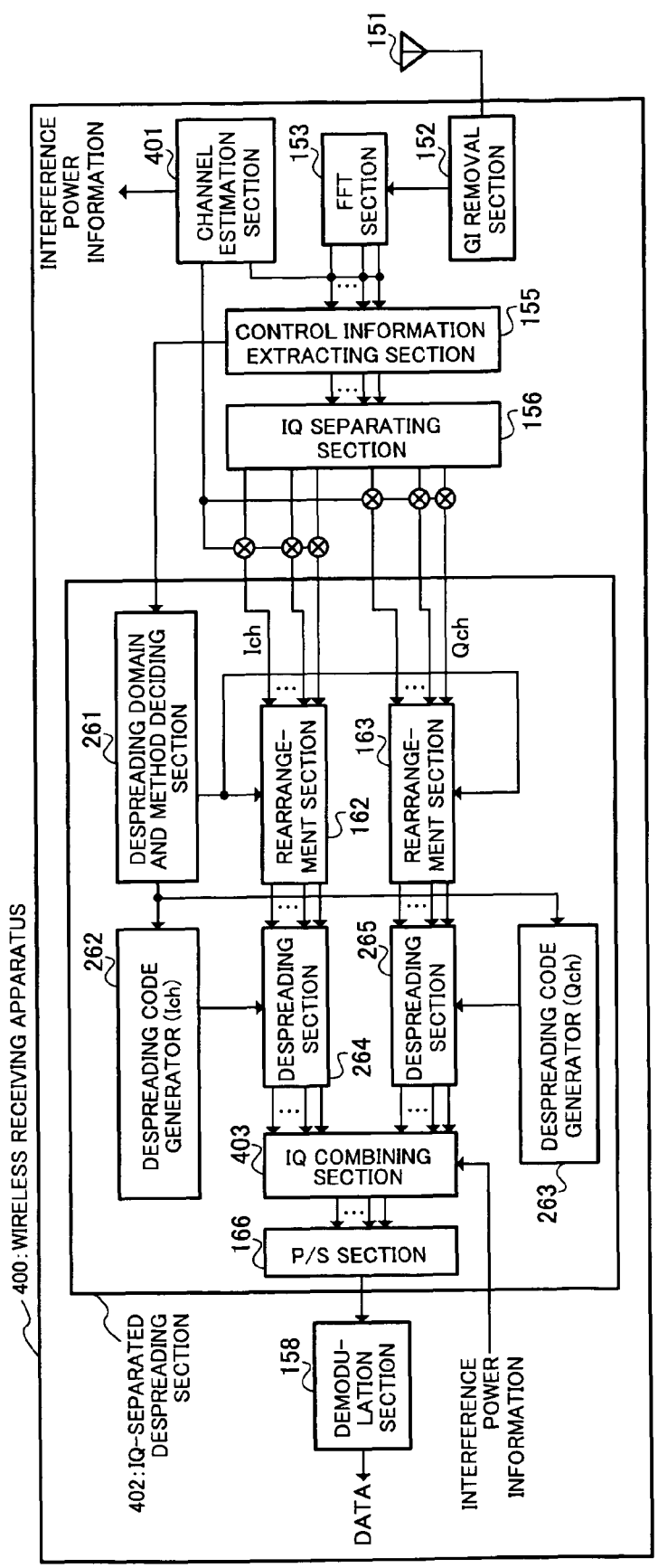
FIG. 18 is a block view showing a configuration for wireless receiving apparatus of Embodiment 4 of the present invention.

FIG. 18 is a block view showing a configuration for a wireless receiving apparatus of Embodiment 4 of the present invention. The wireless receiving apparatus described in this embodiment has a basic configuration the same as that described in Embodiment 1 and Embodiment 2, and components that are the same are assigned the same reference codes, and their detailed descriptions will be omitted.

Wireless receiving apparatus 400 shown in FIG. 18 has a configuration where channel estimation section 401 and IQ-separated despreading section 402 are provided in place of channel estimation section 154 and IQ-separated despreading section 251 of wireless receiving apparatus 250 described in Embodiment 2. IQ-separated despreading section 402 has a configuration where IQ combining section 403 is provided in place of IQ combining section 266 of IQ-separated despreading section 251.

Channel estimation section 401 measures respective interference power in the time domain and frequency domain by carrying out channel estimation using received data after FFT, and assigns weights to the Ich spreading chips and Qch spreading chips after IQ separation.

IQ combining section 403 carries out the same operations described in Embodiment 1 and Embodiment 2, and carries out, for example, MRC or MMSEC based on weight assignment by channel estimation section 401.

Thus, according to this embodiment, it is possible to assign weights to the Ich components and Qch components corresponding to each domain individually, according to the channel estimation results, and carry out combining. It is therefore possible to improve reception characteristics.

Although an example is described with this embodiment where IQ-separated weight assignment is applied to wireless receiving apparatus 250 described in Embodiment 2, it is also possible to carry out the same application for wireless receiving apparatuses 150 and 350 described in Embodiment 1 and Embodiment 3.

In addition, each of functional blocks employed in the description of the above-mentioned embodiment may typically be implemented as an LSI constituted by an integrated circuit. These are may be individual chips or partially or totally contained on a single chip.

"LSI" is adopted here but this may also be referred to as an "IC", "system LSI", "super LSI", or "ultra LSI" depending on differing extents of integration.

Further, the method of integrating circuits is not limited to the LSI's, and implementation using dedicated circuitry or general purpose processor is also possible. After LSI manufacture, utilization of FPGA (Field Programmable Gate Array) or a reconfigurable processor where connections or settings of circuit cells within an LSI can be reconfigured is also possible.

Furthermore, if integrated circuit technology comes out to replace LSI's as a result of the advancement of semiconductor technology or derivative other technology, it is naturally also possible to carry out function block integration using this technology. Application in biotechnology is also possible.

This specification is based on Japanese patent Application No. 2004-186964 filed on Jun. 24, 2004, the entire content of which is expressly incorporated by reference herein.

INDUSTRIAL APPLICABILITY

The wireless transmission apparatus, wireless receiving apparatus, and symbol arrangement method of the present invention are applicable to the transmission and reception of spread modulation symbols.

The invention claimed is:

1. A wireless transmission apparatus comprising:
a modulation section that modulates data to generate a modulation symbol comprised of an in-phase component and a quadrature component;
an arrangement section that arranges a spreading chip of the in-phase component and a spreading chip of the quadrature component obtained by spreading the modulation symbol in regions extending in spreading domains set for the in-phase component and the quadrature component individually; and
a combining section that combines the arranged spreading chip of the in-phase component and the arranged spreading chip of the quadrature component wherein:
the arrangement section comprises a spreading domain setting section that individually and variably sets the spreading domain of the spreading chip of the in-phase component and the spreading domain of the spreading chip of the quadrature component; the spreading domain setting section sets the spreading domain of the spreading chip of the in-phase component to one of a time domain and a frequency domain, sets the spreading domain of the spreading chip of the quadrature component to one of the time domain and the frequency domain, and changes the set domain of the time domain or the frequency domain in accordance with a transmission data parameter.

2. The wireless transmission apparatus of claim 1, wherein the spreading domain setting section sets the spreading domain of the spreading chip of the in-phase component to one of a time domain and a frequency, sets the spreading domain of the spreading chip of the quadrature component to one of the time domain and the frequency domain, and changes the set domain of the time domain or the frequency domain in accordance with information indicating a propagation path condition.

3. The wireless transmission apparatus of claim 1, wherein the spreading domain setting section selects one of a first setting that allows the spreading domain of the spreading chip of the in-phase component and the spreading domain of the spreading chip of the quadrature component to be in a same domain, and a second setting that allows the spreading domain of the spreading chip of the in-phase component and the spreading domain of the spreading chip of the quadrature component to be in different domains.

4. The wireless transmission apparatus of claim 1, wherein the spreading domain setting section sets the spreading domain using a threshold value that changes only one of the spreading domain of the spreading chip of the in-phase component and the spreading domain of the spreading chip of the quadrature component.

5. The wireless transmission apparatus of claim 1, wherein the spreading domain setting section changes one of the spreading domain of the spreading chip of the in-phase component and the spreading domain of the spreading chip of the quadrature component in accordance with a number of retransmissions.

6. The wireless transmission apparatus of claim 5, wherein the spreading domain setting section exchanges the spreading domain of the spreading chip of the in-phase component and the spreading domain of the spreading chip of the quadrature component at a time of retransmission.

7. The wireless transmission apparatus of claim 1, wherein the arrangement section arranges the spreading chip of the in-phase component in a region extending in one of a time domain and a frequency domain, and arranges the spreading chip of the quadrature component in a region extending in another domain of the time domain and the frequency domain.

8. The wireless transmission apparatus of claim 1, wherein the arrangement section arranges the spreading chip of the in-phase component and the spreading chip of the quadrature component at a first region and a second region respectively, the first region and the second region both extending in the time domain and having different positions on the frequency domain.

9. The wireless transmission apparatus of claim 1, wherein the arrangement section arranges the spreading chip of the in-phase component and the spreading chip of the quadrature component at a first region and a second region respectively, the first region and the second region both extending in the frequency domain and having different positions on the time domain.

10. The wireless transmission apparatus of claim 1, wherein the arrangement section arranges the spreading chip of the in-phase component and the spreading chip of the quadrature component, spaced apart from each other.

11. The wireless transmission apparatus of claim 1, wherein the arrangement section comprises a rearrangement section that rearranges one of the spreading chip of the in-phase component and the spreading chip of the quadrature component in a region in which a mutual separation distance is increased.

12. The wireless transmission apparatus of claim 1, wherein the arrangement section comprises a randomizing section that randomizes arrangement of one of the spreading chip of the in-phase component and the spreading chip of the quadrature component.

13. A wireless transmission apparatus comprising:
- a modulation section that modulates data to generate a modulation symbol comprised of an in-phase component and a quadrature component;
- an arrangement section that arranges a spreading chip of the in-phase component and a spreading chip of the quadrature component obtained by spreading the modulation symbol in regions extending in spreading domains set for the in-phase component and the quadrature component individually; and
- a combining section that combines the arranged spreading chip of the in-phase component and the arranged spreading chip of the quadrature component, wherein:
the arrangement section comprises:
- a spreading factor setting section that sets a spreading factor for the in-phase component and a spreading factor for the quadrature component individually;
- a separating section that separates the modulation symbol into the in-phase component and the quadrature component;
- a conversion section that converts part of one of the separated in-phase component and the separated quadrature component into another component; and
- a spreading section that spreads the in-phase component and the quadrature component, part of one of the components being converted into the another component, by corresponding spreading factors.

14. A symbol arrangement method of arranging a modulation symbol comprised of an in-phase component and quadrature component, the symbol arrangement method comprising:
- arranging a spreading chip of an in-phase component and a spreading chip of a quadrature component obtained by spreading the modulation symbol in regions extending in spreading domains set for the in-phase component and the quadrature component individually;
- setting the spreading domain of the spreading chip of the in-phase component to one of a time domain and a frequency domain, setting the spreading domain of the spreading chip of the quadrature component to one of the time domain and the frequency domain, and changing the set domain of the time domain or the frequency domain in accordance with a transmission data parameter; and
- individually and variably setting the spreading domain of the spreading chip of the in-phase component and the spreading domain of the spreading chip of the quadrature component.

15. A symbol arrangement method comprising: modulating data to generate a modulation symbol comprised of an in-phase component and a quadrature component;
- separating the modulation symbol into the in-phase component and the quadrature component;
- converting part of one of the separated in-phase component and the separated quadrature component into another component; and
- setting a spreading factor for the in-phase component and a spreading factor for the quadrature component individually;
- spreading the in-phase component and the quadrature component, part of one of the components being converted into the another component, by corresponding spreading factors;
- arranging a spreading chip of the in-phase component and a spreading chip of the quadrature component obtained by spreading the modulation symbol in regions extending in spreading domains set for the in-phase component and the quadrature component individually;
- combining the arranged spreading chip of the in-phase component and the arranged spreading chip of the quadrature component.

* * * * *

UNITED STATES PATENT AND TRADEMARK OFFICE
CERTIFICATE OF CORRECTION

| | |
|---|---|
| PATENT NO. | : 7,852,903 B2 |
| APPLICATION NO. | : 11/630142 |
| DATED | : December 14, 2010 |
| INVENTOR(S) | : Masaru Fukuoka et al. |

It is certified that error appears in the above-identified patent and that said Letters Patent is hereby corrected as shown below:

Claim 1, column 18, line 20, incorrectly reads:

"ing chip of the quadrature component wherein:"

and should read:

"ing chip of the quadrature component, wherein:"

Signed and Sealed this
Twenty-seventh Day of March, 2012

David J. Kappos
*Director of the United States Patent and Trademark Office*